US012730280B2

(12) United States Patent
Shin et al.

(10) Patent No.: US 12,730,280 B2
(45) Date of Patent: Sep. 8, 2026

(54) CAMERA MODULE

(71) Applicant: SAMSUNG ELECTRO-MECHANICS CO., LTD., Suwon-si (KR)

(72) Inventors: Jun Sup Shin, Suwon-si (KR); Chuel Jin Park, Suwon-si (KR); Young Bok Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 674 days.

(21) Appl. No.: 17/963,688

(22) Filed: Oct. 11, 2022

(65) Prior Publication Data

US 2023/0176315 A1 Jun. 8, 2023

(30) Foreign Application Priority Data

Dec. 8, 2021 (KR) ........................ 10-2021-0174345
Aug. 5, 2022 (KR) ........................ 10-2022-0097681

(51) Int. Cl.
*G02B 7/02* (2021.01)
*G03B 13/36* (2021.01)

(52) U.S. Cl.
CPC ............. *G02B 7/021* (2013.01); *G03B 13/36* (2013.01)

(58) Field of Classification Search
CPC ...... G02B 7/021; G02B 27/0006; G02B 7/08; G02B 7/09; G03B 13/36; G03B 30/00; G03B 5/02; G03B 2205/0015; G03B 2205/0069; G03B 3/10
See application file for complete search history.

(56) References Cited

U.S. PATENT DOCUMENTS

2014/0071335 A1* 3/2014 Lee .......................... G02B 7/10 359/823
2015/0177476 A1* 6/2015 Kudoh .................. G02B 7/026 359/830
2017/0134628 A1* 5/2017 Hwang .................... G03B 3/10
2022/0004085 A1 1/2022 Shabtay et al.
2022/0334403 A1 10/2022 Onodera et al.

FOREIGN PATENT DOCUMENTS

CN 113272703 A 8/2021
CN 113405000 A 9/2021
CN 214375503 U 10/2021
(Continued)

OTHER PUBLICATIONS

Korean Office Action issued on Aug. 21, 2024, in counterpart Korean Patent Application No. 10-2022-0097681 (5 pages in English, 5 pages in Korean).
(Continued)

*Primary Examiner* — Mariam Qureshi
(74) *Attorney, Agent, or Firm* — NSIP Law

(57) ABSTRACT

A camera module includes a lens module including one or more lenses; a fixing frame having a rectangular cross-section formed along a circumference of the lens module; a first driver, disposed along a first side surface of the fixing frame, configured to provide a first driving force in a first direction intersecting an optical axis of the lenses; and a cam assembly configured to convert the first driving force into a second driving force in an optical axis direction.

9 Claims, 23 Drawing Sheets

(56) References Cited

FOREIGN PATENT DOCUMENTS

| | | | |
|---|---|---|---|
| CN | 115268006 | A | 11/2022 |
| KR | 10-2003-0086017 | A | 11/2003 |
| KR | 10-2014-0034616 | A | 3/2014 |
| KR | 10-1579586 | B1 | 12/2015 |
| KR | 10-2021-0054582 | A | 5/2021 |
| KR | 10-2021-0088258 | A | 7/2021 |
| WO | WO 2021/059097 | A2 | 4/2021 |

OTHER PUBLICATIONS

Chinese Office Action issued on Jun. 20, 2025, in corresponding Chinese Patent Application No. 202211596510.0. (5pages in English, 9pages in Chinese).

* cited by examiner

CAMERA MODULE

CROSS-REFERENCE TO RELATED APPLICATION(S)

This application claims the benefit under 35 USC 119(a) of Korean Patent Application Nos. 10-2021-0174345 filed on Dec. 8, 2021, and 10-2022-0097681 filed on Aug. 5, 2022, in the Korean Intellectual Property Office, the entire disclosures of which are incorporated herein by reference for all purposes.

BACKGROUND

1. Field

The following description relates to a camera module.

2. Description of Related Art

A portable electronic device includes a camera module. For example, smartphones, notebook PCs, or the like include one or more camera modules. As imaging and video recording using portable electronic devices become more common, a high-performance camera module may be desired. However, implementing the high-performance camera module may increase the size of the camera module, and thus the thinning of the portable electronic device may be hindered. For example, there may be an issue in a high-performance camera module with a camera module that protrudes outside of a smartphone's surface or limits a degree of design freedom.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens module including one or more lenses; a fixing frame having a rectangular cross-section formed along a circumference of the lens module; a first driver, disposed along a first side surface of the fixing frame, configured to provide a first driving force in a first direction intersecting an optical axis of the lenses; and a cam assembly configured to convert the first driving force into a second driving force in an optical axis direction.

The first driver may include a drive motor, and an operation member configured to move on a drive shaft of the drive motor in the first direction.

The cam assembly may include a first cam member configured to move in the first direction, the first cam member having a first projection protruding toward a side surface of the lens module; and a second cam member extending in a diagonal direction with respect to the first direction, the second cam member having a first cam groove configured to fit the first projection and a guide groove extending in the optical axis direction.

The first cam groove may be open toward a lower portion of the second cam member, and the guide groove may be open toward an upper portion of the second cam member.

The fixing frame may include a lower fixing frame having a seat portion configured to partially contact a protrusion portion extending in a direction opposite to the first projection from a side surface of the first cam member, and an upper fixing frame having a second projection configured to fit into a guide groove of the second cam member.

The camera module may further include a first shield can configured to surround a circumference of the fixing frame, a second shield can configured to cover an upper portion of the second cam member, and an airtight member configured to seal a space between the first housing and the second housing.

The lens module may include a housing, and a lens barrel disposed in the housing.

The camera module may further include an elastic member, disposed between the housing and the lens barrel, configured to provide inertial force pushing up the lens barrel upwardly.

The lens module may further include a first movable frame, disposed in the housing, configured to move in the optical axis direction; a second movable frame, disposed on the first movable frame, configured to move in the first direction intersecting the optical axis; and a barrel holder disposed on the second movable frame and coupled to the lens barrel.

The lens module may further include a second driver configured to drive the first movable frame in the optical axis direction or to drive the second movable frame in the first direction intersecting the optical axis.

In another general aspect, a camera module includes a housing; a lens module configured to move in an optical axis direction through an opening of the housing; a first driver, disposed in the housing, configured to provide a driving force to recede and advance the lens module; and a projection and a guide groove formed in the housing and the lens module, respectively, wherein the lens module is configured to partially remain in the housing when driven by the driving force. A ratio (BFL/TTL) between a distance (TTL) from an object side surface of a frontmost lens of the lens module to an image sensor and a distance (BFL) from an image side surface of a rearmost lens of the lens module to the image sensor, in a state in which the lens module is maximally moved out, is greater than or equal to 0.2 and less than or equal to 0.5.

The guide groove may be formed on a side surface of the lens module, and the projection may be formed in the opening of the housing.

The first driver may include a first magnet member and a first coil member disposed in the lens module and the housing, respectively.

The first driver may include a rack and a pinion gear disposed in the lens module and the housing, respectively.

The first driver may include a piezoelectric element disposed in the lens module and the housing, respectively.

The lens module may further include a second driver configured to drive one or more lenses accommodated in the lens module in the optical axis direction.

An elastic member, disposed between the housing and a lens barrel of the housing, may be configured to provide inertial force pushing up the lens barrel.

Other features and aspects will be apparent from the following detailed description, the drawings, and the claims.

BRIEF DESCRIPTION OF DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
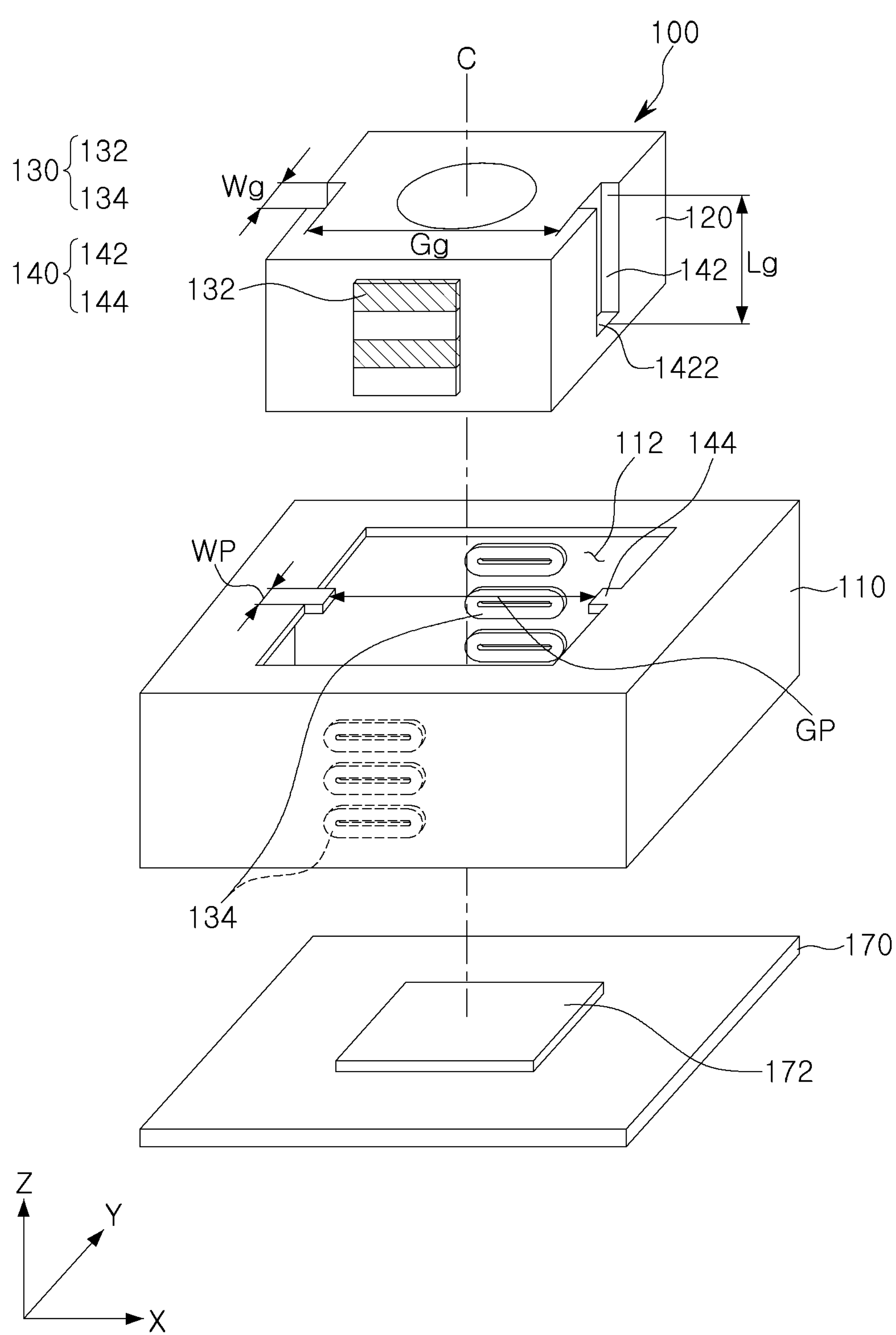
FIG. 1 is an exploded perspective view of a camera module according to an example embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

A camera module, according to the present disclosure, may be mounted on an electronic device. For example, the camera module may be mounted on a portable terminal, a notebook computer, a VR device, glasses, or the like. However, electronic devices on which the camera module is mountable are not limited to the above-described devices. As an example, the camera module may be mounted in any portable electronic device, such as a portable game machine.

An aspect of the present disclosure provides a camera module that is easily mountable in a small-sized electronic device, or an electronic device required to be thinned while having high-performance optical properties.

According to the present disclosure, a camera module may perform automatic focus adjustment and focus magnification adjustment while being mountable on a small and thin electronic device.

According to a first aspect of the present disclosure, a camera module may include a housing, a lens module, a driver, and a regulator. However, according to the first aspect, a component of the camera module is not limited to the above-described members. The housing may be configured to accommodate the lens module. For example, an opening may be formed in the housing to enable the lens module to be moved in and out. The driver may provide the driving force desired for carrying in and carrying out the lens module. For example, the lens module may be moved into the housing or moved out of the housing by the driving force of the driver. The regulator may be configured to limit the displacement movement of the lens module. For example, the regulator may limit the maximum displacement of the lens module such that the lens module is not completely moved out of the housing.

According to the first aspect, the camera module may be configured to have predetermined optical properties. As an example, in a state in which the lens module is maximally moved out, a ratio (BFL/TTL) between a distance (TTL) from an object-side surface of a frontmost lens of the lens module to an image sensor and a distance (BFL) from an image-side surface of a rearmost lens of the lens module to the image sensor may be 0.2 or more and 0.5 or less.

The camera module, according to the first aspect, may be configured to be mountable on a small electronic device and an ultra-thin electronic device. For example, the camera module, according to the first aspect, may maintain a minimum distance between the lens module and the image sensor in an inactive state (that is, a state in which actual imaging and imaging are not performed or a state in which the lens module is maximally moved into the housing).

In the camera module, according to the first aspect, the driver may be configured in various forms (in a range enabling the lens module to be moved in and out). As an example, the driver may be configured in the form of a magnet and a coil to drive the lens module through magnetic force. As another example, the driver may be configured in the form of a rack and a pinion gear to drive the lens module mechanically, or may be configured in a form including a cam assembly. As another example, the driver may be configured in a form including a piezoelectric element to drive the lens module using piezoelectric force.

According to a second aspect of the present disclosure, a camera module may include a lens module, a first driver, a cam assembly, and a regulator. However, according to the second aspect, a camera module component is not limited to the above-described members.

In the camera module, according to the second aspect, the lens module may include a lens. For example, the lens module may include three or more lenses to form an image of incident light on an image sensor. However, the number of lenses included in the lens module is not limited to three. The first driver may be configured to provide first driving force in a first direction, intersecting an optical axis of a lens. For example, the first driver may be configured to generate driving force in a width direction of the lens module, intersecting the optical axis. The cam assembly may be configured to provide second driving force desired for moving the lens module in an optical axis direction. For example, the cam assembly may be configured to convert the first driving force of the driver in the optical axis direction. The regulator may be configured to limit the movement displacement of the lens module. For example, the regulator may limit the maximum displacement of the lens module movable from the image sensor in the optical axis direction.

Hereinafter, example embodiments of the present disclosure will be described in detail, based on the accompanying drawings.

First, a camera module, according to an example embodiment, will be described with reference to FIGS. 1 to 4.

A camera module 100, according to an example embodiment, may include a housing 110, a lens module 120, a first driver 130, and a regulator 140. However, a component of the camera module 100 is not limited to the above-described components. For example, the camera module 100 may further include a substrate 170 on which an image sensor 172 is mounted.

The housing 110 may be configured to accommodate at least a portion of the lens module 120. For example, the housing 110 may be configured to completely accommodate the lens module 120 in an inner space thereof, or may be configured to accommodate a portion of the lens module 120 in the inner space. An opening 112 may be formed on one side (upper portion) of the housing 110 to enable the lens module 120 to be moved in and out. The opening 112 may be open in the direction of an optical axis C of the lens module 120.

Figure 3:
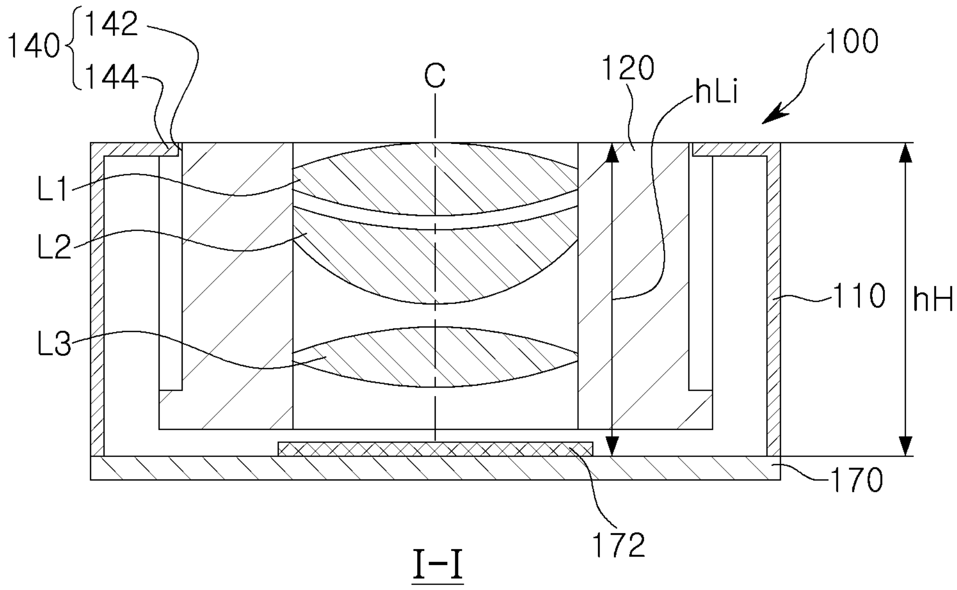
FIGS. 3 and 4 are cross-sectional views of the camera module illustrated in FIG. 2.

The lens module 120 may include one or more lenses. For example, the lens module 120 may include three lenses L1, L2, and L3, as illustrated in FIG. 3. However, the number of lenses included in the lens module 120 is not limited to three. For example, the lens module 120 may include two or less lenses or four or more lenses. The lens module 120 may further include a component for accommodating a lens. For example, the lens module 120 may further include a lens barrel configured to accommodate only a lens.

The lens module 120 may be configured to be moved in and out of the housing 110. As an example, the lens module 120 may be configured to be moved into the housing 110 in an inactive state (a state in which imaging and imaging are practically impossible) of the camera module 100, and to be moved out of the housing 110 in an active state (a state in which imaging and imaging are practically possible) of the camera module 100. As another example, the lens barrel of the lens module 120 may be configured to move in the optical axis direction separately from the lens module 120. As a specific example, the lens barrel may be configured to move in a direction closer to the image sensor in an inactive state (a state in which imaging and imaging are practically impossible) of the camera module 100, and to move in a direction away from the image sensor in an active state (a state in which imaging and imaging are practically possible) of the camera module 100.

The amount of the lens module 120 moved in may be determined according to a size of the camera module 100 or a size of an electronic device on which the camera module 100 is mounted. For example, the lens module 120 may be moved into the housing 110 at a maximum size to facilitate thinning of the small camera module 100 or the electronic device. In more detail, the lens module 120 may be moved in to be maximally close to the substrate 170 and the image sensor 172 coupled to the other side (lower portion of FIG. 1) of the housing 110. A height of the lens module 120 in a carry-in state (a height from the substrate 170 to an upper end of the lens module 120: hLi) may be substantially equal to a height of the housing 110 (a height from the substrate 170 to an upper end of the housing 110: hH) (see FIGS. 2 and 3). In more detail, an upper surface of the lens module 120 may be positioned on a plane the same as an upper surface of the housing 110. However, hLi and hH do not necessarily have the same size. For example, hLi may be greater than hH depending on the number of lenses included in the lens module 120 or a type of the camera module 100 (that is, a portion of the lens module 120 in a carry-in state may be exposed toward an upper portion of the housing 110).

An amount of the lens module 120 moved out may be determined according to a focal length of the camera module 100. For example, when the camera module 100 has a long focal length, the lens module 120 may be configured to be moved out of the housing 110 to a maximum size. Conversely, when the camera module 100 has a short focal length, the lens module 120 may be configured to be moved out of housing 110 in a relatively small size.

The amount of the lens module 120 moved out may have a predetermined relationship with the optical properties of the camera module 100. For example, in a state in which the lens module 120 is moved out, a ratio (BFL/TTL) between a distance (TTL) from the image sensor 172 to a frontmost lens of the lens module 120 and a distance (BFL) from the image sensor 172 to a rearmost lens of the lens module 120 may be 0.2 or more and 0.5 or less.

Figure 4:
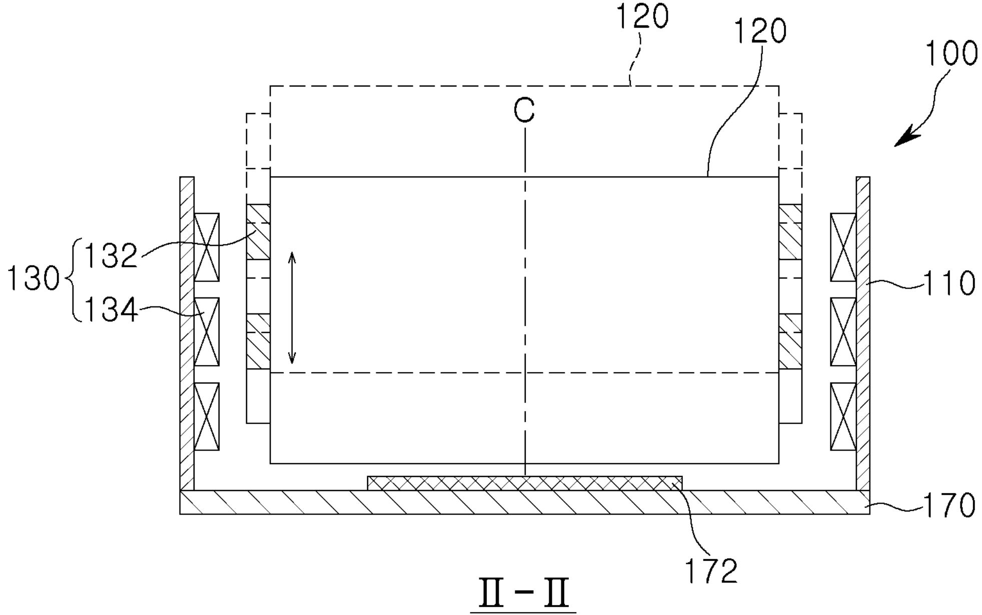

The first driver 130 may be configured to drive the lens module 120 in the optical axis direction. For example, the first driver 130 may provide the driving force desired for carrying the lens module 120 into the housing 110 or the lens module 120 out of the housing 110. The first driver 130 may include a first magnet member 132 and a first coil member 134. However, a component of the first driver 130 is not limited to the first magnet member 132 and the first coil member 134 described above. The first magnet member 132 and the first coil member 134 may be disposed on the housing 110 and the lens module 120 to be opposite each other, as illustrated in FIG. 4. For example, the first magnet member 132 may be disposed on the front and rear side surfaces of the lens module 120 (a direction based on FIG. 1), and the first coil member 134 may be disposed on an inner surface of the housing 110. The first magnet member 132 and the first coil member 134 may be configured to provide the driving force in the direction of the optical axis C. For example, the first magnet member 132 may be configured so that two or more polarities are formed in the optical axis direction. A plurality of first coil members 134 may be disposed at predetermined intervals in the optical axis direction.

The regulator 140 may be configured to limit movement displacement of the lens module 120. The regulator 140 may be formed in the housing 110 and the lens module 120. For example, the regulator 140 may be configured in the form of a guide groove 142 formed on a side surface of the lens module 120 and a projection 144 formed in the vicinity of the opening 112 of the housing 110. However, the form of the regulator 140 is not limited to the guide groove 142 and the projection 144. For example, the regulator 140 may be changed in any form capable of limiting the maximum movement displacement of the lens module 120.

The guide groove 142 may be formed on the side surface of the lens module 120. For example, the guide groove 142 may be formed in left and right side surfaces (a direction based on FIG. 1) of the lens module 120 on which the first magnet member 132 is not disposed. However, the formation position of the guide groove 142 is not limited to the left and right side surfaces of the lens module 120. For example, the guide groove 142 may be formed on the front and rear side surfaces of the lens module 120 on which the first magnet member 132 is formed. The guide groove 142 may be formed to be elongated in the direction of the optical axis C on the side surface of the lens module 120. In more detail, the guide groove 142 may be elongated from a point having a predetermined height from a lowermost end of the lens module 120 to an uppermost end of the lens module 120. The guide groove 142 may be formed to have a predetermined length Lg. For example, the length Lg of the guide groove 142 may be greater than or equal to a drivable displacement of the lens module 120.

The projection 144 may be formed on the housing 110. As a specific example, the projection 144 may be formed around the opening 112 through which direct or indirect contact between the housing 110 and the lens module 120 is possible. The projection 144 may extend in a direction, intersecting the optical axis, to be fitted into the guide groove 142 of the lens module 120. The projection 144 may limit the lens module 120 to move only in the direction of the optical axis C. As an example, a width Wp of the projection 144 may be formed to have a size substantially the same as that of a width Wg of the guide groove 142, such that the lens module 120 may not move in a second direction (Y-axis direction based on FIG. 1), intersecting the optical axis. As another example, a distance Gp between the projections 144 may be formed to have a size substantially the same as that of a distance Gg between the guide grooves 142, such that the lens module 120 may not move in a first direction (X-axis direction based on FIG. 1), intersecting the optical axis. The projection 144 may limit the maximum movement displacement of the lens module 120. For example, the projection 144 may be formed to be in contact with a lower end 1422 of the guide groove 142, such that the lens module 120 may not be completely separated from the opening 112 of the housing 110.

The substrate 170 may be configured to be coupled to the housing 110. For example, the substrate 170 may be attached to a lower end of the housing 110 or fitted into the lower end of the housing 110. The substrate 170 may include electronic parts desired for driving the camera module 100. For example, the image sensor 172 may be mounted on a surface of the substrate 170.

Figure 2:
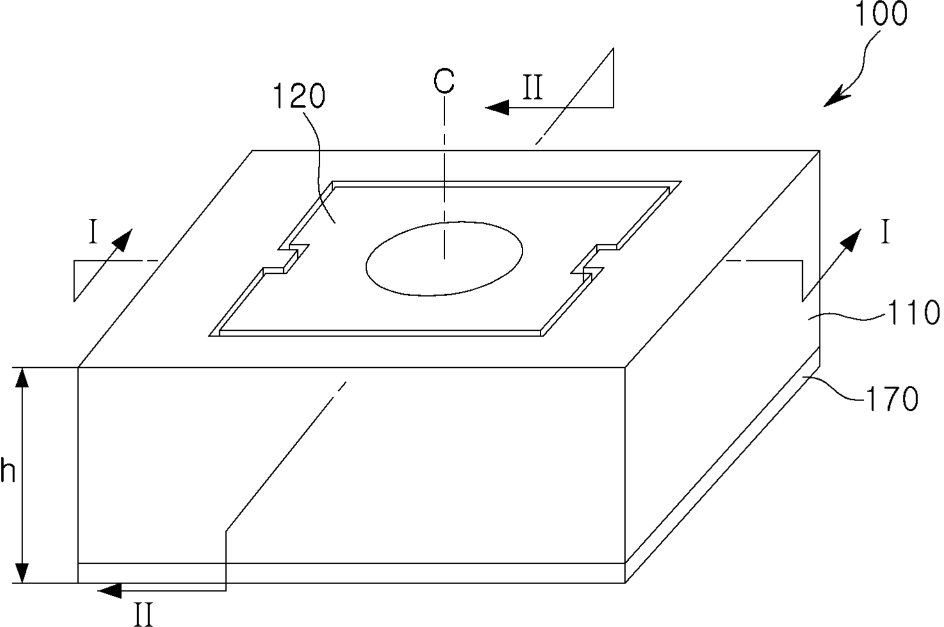
FIG. 2 is a combined perspective view of the camera module illustrated in FIG. 1.

The camera module 100 configured as above may be configured to have an ultra-thin form, as illustrated in FIGS. 2 to 4. In detail, the camera module 100 according to the present example embodiment may be maintained in a state in which the lens module 120 is completely moved into the housing 110, a mounting space and the height of the camera module 100 may be significantly reduced. Therefore, the camera module 100, according to the present example embodiment, may be mounted on an ultra-thin electronic device and an electronic device with many space constraints (for example, AR glasses, VR glasses, or the like).

Figure 5:
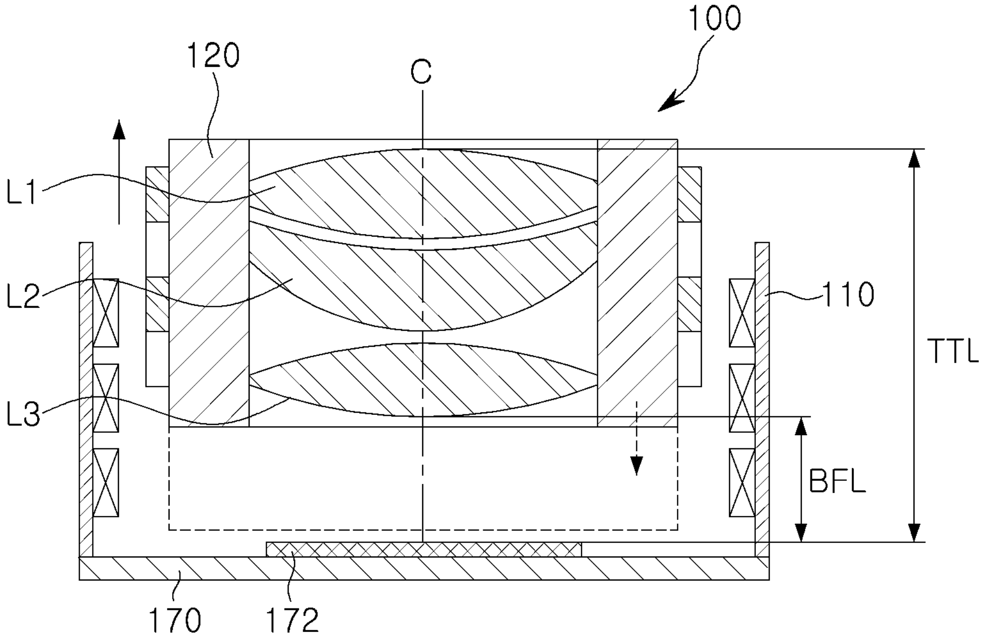
FIG. 5 is a cross-sectional view of a camera module according to an operation state.

Next, an operation example of the camera module 100 will be described with reference to FIGS. 4 and 5.

The camera module 100, according to the present example embodiment, may be configured to have a form that varies depending on a driving state or whether it is driven. As an example, the camera module 100 may be configured to have a minimum size in an inactive state, and may be configured to have a maximum size in an active state. In detail, an interval between the image sensor 172 and the lens module 120 may be minimal in an inactive state of the camera module 100, and an interval between the image sensor 172 and the lens module 120 may be maximum in an active state of the camera module 100.

The camera module 100 may move the lens module 120 in the optical axis direction to enable smooth imaging and imaging of the camera module 100. For example, the camera module 100 may move the lens module 120 upwardly to sufficiently secure a distance (TTL) from an object-side surface of a frontmost lens L1 to the image sensor 172 and a distance (BFL) from an image-side surface of a rearmost lens L3 to the image sensor 172. Sizes of the TTL and BFL may be changed according to the optical properties of the lenses L1, L2, and L3 included in the lens module 120. However, it may be desirable to satisfy the following conditional expression to enable implementation of the camera module 100 having a high resolution or a long focal length.

$$0.2 \le BFL/TTL \le 0.5$$

Next, another form of driver will be described with reference to FIGS. 6 to 8.

The camera modules 102, 104, and 106 may include various forms of driver 130 within a range enabling driving of the lens module 120.

Figure 6:
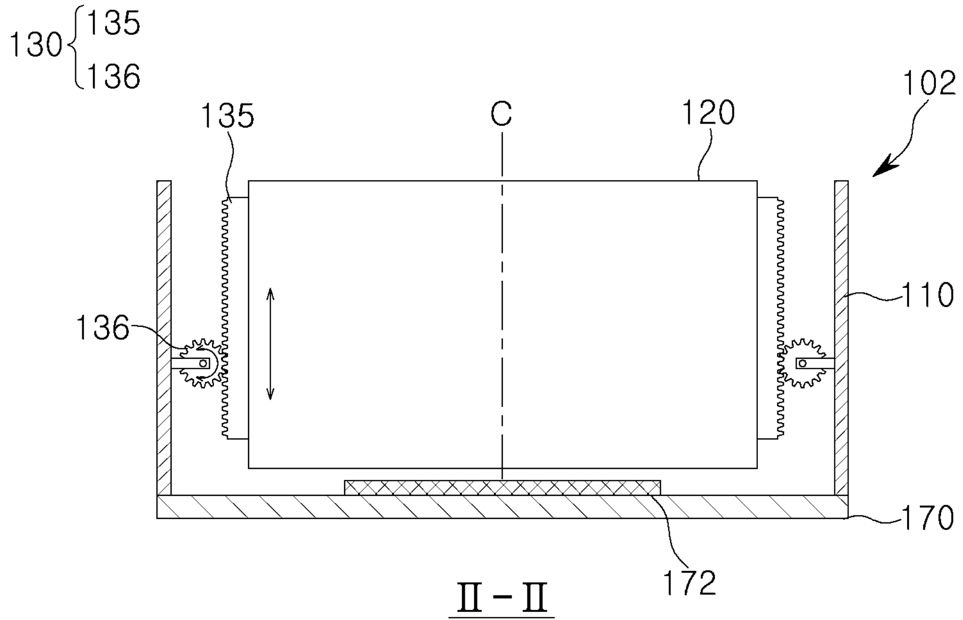
FIGS. 6 to 8 are cross-sectional views of a camera module according to a modification.

As an example, a camera module 102, according to a first modification, may include a driver 130, including a rack 135 and a pinion gear 136, as illustrated in FIG. 6. The rack 135 and the pinion gear 136 may be formed respectively in the lens module 120 and the housing 110. For example, the rack 135 may be formed on a side surface of the lens module 120, and the pinion gear 136 may be formed on the inside of the housing 110. For reference, according to the first modification in the camera module 102, the driver 130 may include a motor (not illustrated) for driving the pinion gear 136.

Figure 7:
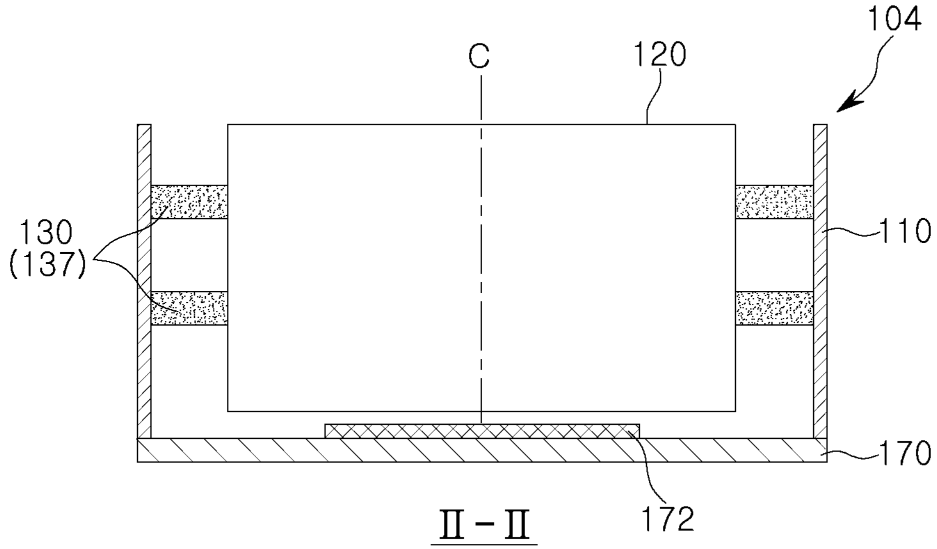

As another example, a camera module 104, according to a second modification, may include a driver 130 including a piezoelectric element 137, as illustrated in FIG. 7. The piezoelectric element 137 may be formed in the housing 110, and may be disposed to be in physical contact with the lens module 120. For reference, the camera module 104, according to the present example embodiment, may move the lens module 120 in the optical axis direction through expansion and contraction motions of the piezoelectric element 137.

Figure 8:
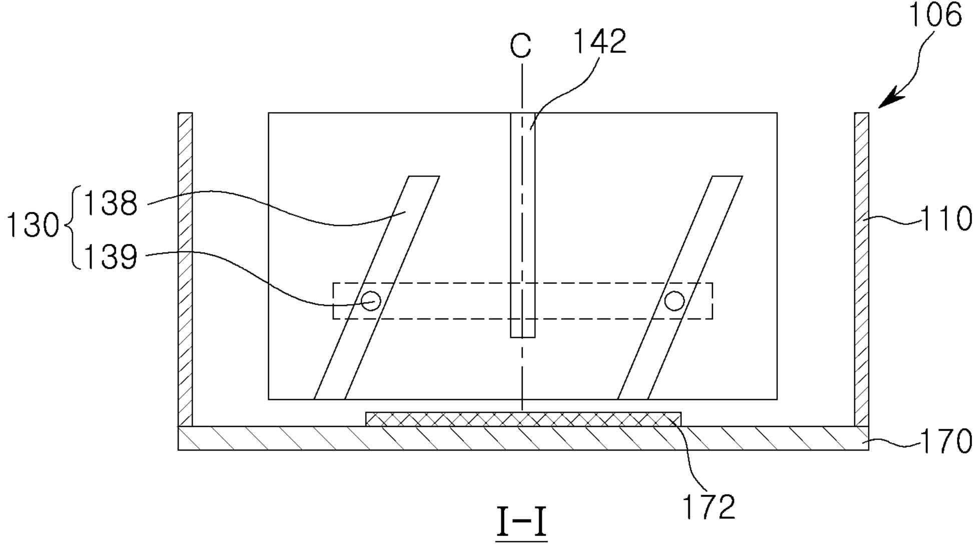

As another example, a camera module 106, according to a third modification, may include a driver 130, including a cam groove 138 and a cam pin 139, as illustrated in FIG. 8. The cam groove 138 and the cam pin 139 may be formed respectively in the housing 110 and the lens module 120. In more detail, the cam groove 138 is formed on a side surface of the lens module 120 to incline with respect to the optical axis C, and the cam pin 139 may be configured to be fitted into the cam groove 138. The cam pin 139 may be formed to be drivable inside the housing 110. For example, the cam pin 139 may be driven in a direction, intersecting the optical axis C. The camera module 106 configured as described above may enable vertical movement of the lens module 120 through the cam pin 139 reciprocating in the direction, intersecting the optical axis C.

Although a modification of the driver 130 is described above, the modifications of the driver 130 are not limited to the forms illustrated in FIGS. 6 to 9. For example, the driver 130 may be changed to another form within a range enabling a linear motion of the lens module 120.

Figure 9:
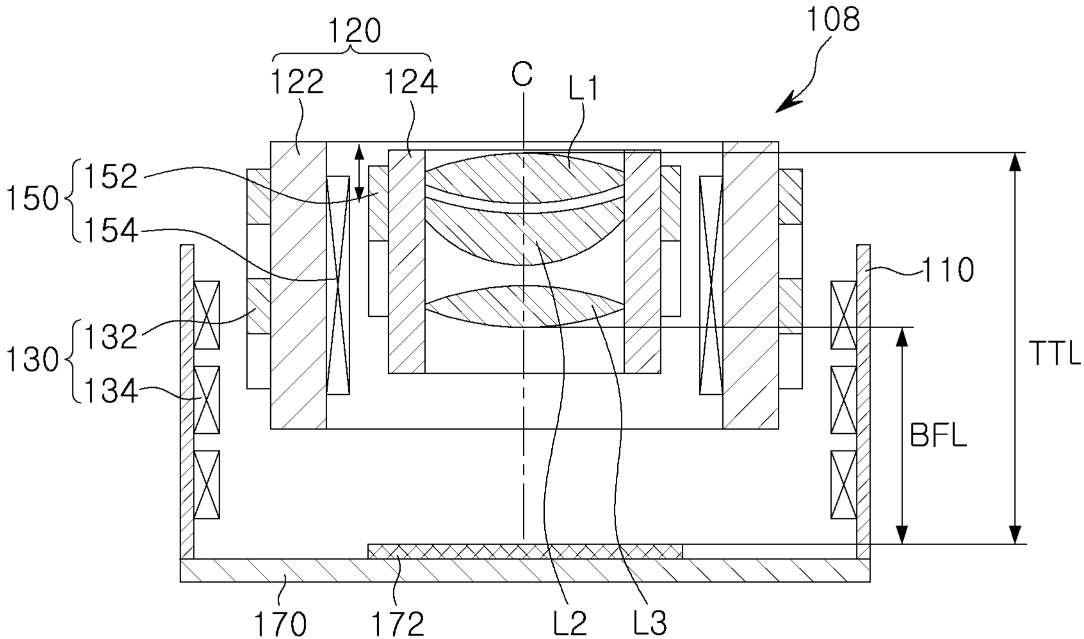
FIG. 9 is a cross-sectional view of a camera module according to another modification.

Next, a camera module, according to another modification, will be described with reference to FIG. 9.

The camera module 108, according to the present modification, may include a plurality of driver. For example, the camera module 108, according to the present modification, may include a first driver 130 for driving the lens module 120, and a second driver 150 for driving one or more lenses. In the present modification, the lens module 120 may include a barrel holder 122 and a lens barrel 124. The lens barrel 124 may be configured to receive one or more lenses L1, L2, and L3, and the barrel holder 122 may be configured to receive the lens barrel 124.

The first driver 130 may be formed in the housing 110 and the lens module 120. For example, the first magnet member 132 of the first driver 130 may be formed in the lens module 120, and the first coil member 134 may be formed in the housing 110. The first driver 130 configured as described above may enable a size change according to the driving state of the camera module 108. For example, the first driver 130 may reduce the size of the camera module 108 by carrying the lens module 120 into the housing 110 in an inactive state of the camera module 108, and may expand the size of the camera module 108 by carrying the lens module 120 out of the housing 110 in an active state of the camera module 108.

The second driver 150 may be formed in the lens module 120. For example, a second magnet member 152 of the second driver 150 may be formed in the barrel holder 122, and a second coil member 154 of the second driver 150 may be formed in the lens barrel 124. The second driver 150 configured as described above may enable focus adjustment of the camera module 108. For example, the second driver 150 may finely move the lens barrel 124 in the optical axis direction in an active state of the camera module 108.

The camera module 108 configured as described above may reduce and expand the overall size of the camera module 108, and thus may be easily mounted on a portable electronic device. In addition, the camera module 108 may perform focus adjustment by driving the lens barrel 124, thereby improving the imaging and imaging quality of the camera module 108.

Next, a camera module, according to another embodiment, will be described with reference to FIGS. 10 to 18.

A camera module 200, according to the present example embodiment, may include a substrate 210, a lens module 220, a first driver 230, a cam assembly 240, and a regulator. However, a component of the camera module 200 is not limited to the above-described components. For example, the camera module 200 may further include a fixing frame 260, a shield can 270, and the like.

Hereinafter, the above-described components will be sequentially described.

The substrate 210 may be configured to electrically connect to electronic parts desired for driving the camera module 200. For example, an image sensor 212, a driving element, a passive element, or the like may be mounted on the substrate 210. However, types of electronic parts mounted on the substrate 210 are not limited to the image sensor 212, a driving element, and a passive element. For example, a connection terminal 214 for connection to an external device may be formed on the substrate 210.

The lens module 220 may be configured to refract an optical signal reflected from a subject to the image sensor 212. For example, the lens module 220 may include one or more lenses to form an image of incident light on the image sensor 212.

The first driver 230 may be configured to move the lens module 220 in the direction of the optical axis C or to limit the movement of the lens module 230 in an optical axis direction. As an example, the first driver 230 may move the lens module 220 to be closer to the image sensor 212 or away from the image sensor 212. As another example, the first driver 230 may adjust or limit the magnitude of movement of the lens module 220 in a direction, using an elastic member.

The first driver 230 may include a driving motor 232, an operation member 234, and a fixing bracket 236. The driving motor 232 may be configured to rotate in one direction or the other direction according to an electrical signal, and the operation member 234 may be configured to move in a first direction (+X-axis direction or −X-axis direction) according to a rotation direction of the driving motor 232. The fixing bracket 236 may be configured to enable a linear reciprocating motion of the operation member 234 while firmly supporting the driving motor 232.

The first driver 230 may be configured to enable downsizing and thinning of the camera module 200. As an example, the first driver 230 may be disposed in parallel along a side surface of the substrate 210. As another example, a longitudinal length of the first driver 230 may be substantially equal to a long axial length of the substrate 210. As another example, the first driver 230 may be disposed in parallel along a first side surface of the fixing frame 260. In more detail, the first driver 230 and a drive shaft of the first driver 230 may be configured not to deviate to the outside of the first side surface of the opposing fixing frame 260. The first driver 230 configured as described above may minimize a space in which the first driver 230 is disposed, thereby enabling downsizing and thinning of the camera module 200.

The cam assembly 240 may be configured to convert the first driving force of the first driving unit 230 into a second driving force desired for the movement of the lens module 220. For example, the cam assembly 240 may convert driving force in an X-axis direction of the operation member 234 into driving force in an optical axis (C: Z axis) direction. The cam assembly 240 may include a first cam member 242 and a second cam member 244.

The first cam member 242 may be configured to be coupled to, or in contact with, the first driver 230. For example, the first cam member 242 may be configured to be coupled to the operation member 234 of the first driver 230 through a fastener such as an adhesive or a bolt. The first cam member 242 may be moved in a first direction by the first driver 230. For example, the first cam member 242 may move in a direction (+X-axis direction or −X-axis direction) the same as that of the operation member 234 as the operation member 234 is driven.

The first cam member 242 may include a component for coupling with the second cam member 244. For example, a first projection 2422 protruding toward a side surface of the lens module 220 may be formed on the first cam member 242. The first cam member 242 may include a component for coupling with the fixing frame (260:262, 264). For example, the first cam member 242 may include a protrusion portion 2424 for being in contact with a lower fixing frame 262.

The first cam member 242 may be configured in a form capable of surrounding four side surfaces of the lens module 220. For example, the first cam member 242 may have a rectangular frame surrounding the circumference of the lens module 220. However, the form of the first cam member 242 is not limited to a rectangular frame. An inner space 242A of the first cam member 242 may have a size larger than that of a cross-sectional area of the lens module 220. For example, a first direction length Xc of the inner space 242A may be greater than a first direction length XL of the lens module 220, and a second direction length Yc of the inner space 242A may be greater than a second direction length YL of the lens module 220. Here, a deviation between Xc and XL may have a predetermined relationship with driving in the direction of the optical axis C of the lens module 220. As an example, the deviation between Xc and XL may be equal to or greater than a maximum displacement ML by which the lens module 220 is movable in the optical axis (C: Z axis) direction. In more detail, Xc, XL, and ML may satisfy a relational expression $ML \leq Xc-XL$. A deviation between Yc and YL may be set to limit the movement of the lens module 220 in a second direction. For example, the deviation between Yc and YL may be limited to have a magnitude capable of minimizing the movement of the lens module 220 in the second direction.

The second cam member 244 may be configured to be connected to the first cam member 242. For example, the second cam member 244 may be physically connected to the first cam member 242 by coupling between a first cam groove 2442 and the first projection 2422 formed on (opposite) side surfaces thereof. The first cam groove 2442 may be formed to have a predetermined size. For example, a width Wg1 of the first cam groove 2442 may be substantially equal to or slightly greater than the diameter of the first projection 2422. The first cam groove 2442 having the above-described shape may limit the movement direction of the first projection 2422 to a longitudinal direction of the first cam groove 2442.

Figure 11:
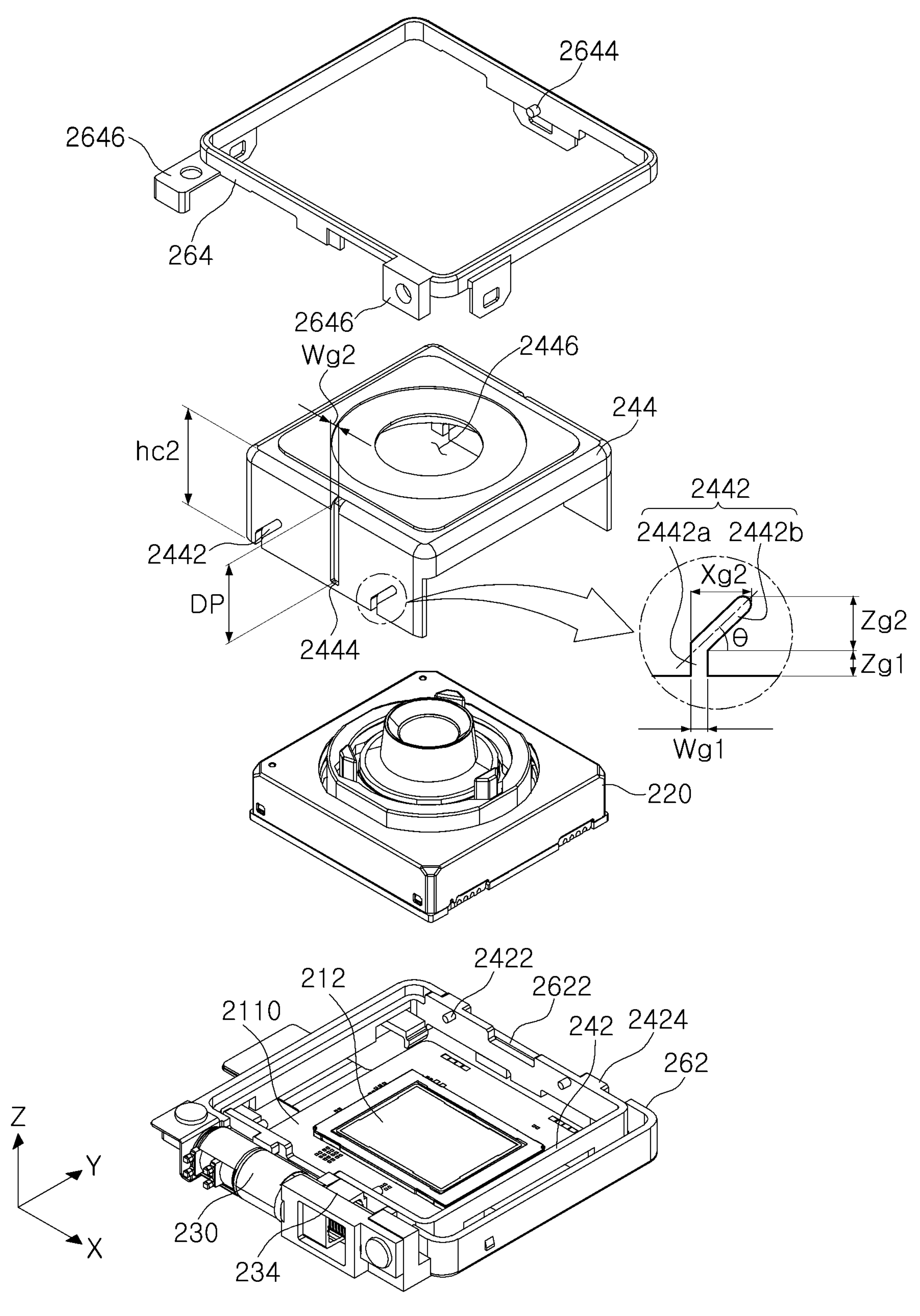
FIGS. 11 to 14 are partially combined views of the camera module illustrated in FIG. 10.

The first cam groove 2442 may be substantially formed in a Z-axis direction. However, the overall extension direction of the first cam groove 2442 is not necessarily parallel to a Z-axis. For example, as illustrated in FIG. 11, the first cam groove 2442 may include a first section 2442*a* parallel to the Z-axis and a second section 2442*b* extending diagonally with respect to an X-axis and the Z-axis. The first section 2442*a* may formed to be shorter than the second section 2442*b*. For example, a Z-axis direction length Zg1 of the first section 2442*a* may be shorter than a Z-axis direction length Zg2 of the second section 2442*b* and an X-axis direction length Xg2 of the second section 2442*b*. The first section 2442*a* may have a size of enabling smooth coupling between the first cam groove 2442 and the first projection 2422. For example, the Z-axis direction length Zg1 of the first section 2442*a* may be equal to or slightly greater than the diameter of the first projection 2422. An inclination angle θ of the second section 2442*b* may be substantially determined in a range of 40 to 50 degrees. For example, the inclination angle θ may be 45 degrees. The second section 2442*b* may be formed to have a substantially similar size to that of maximum movement displacement of the lens module 220. For example, the Z-axis direction length Zg2 in the second section 2442*b* may be substantially equal to or greater than the maximum displacement ML (in the optical axis direction) of the lens module 220.

The second cam member 244 may be configured to be coupled to the lens module 220. For example, the second cam member 244 may be configured to be firmly coupled to an upper portion and opposite side surfaces of the lens module 220. Accordingly, the second cam member 244 and the lens module 220 may move integrally using the first driver 230. For reference, reference numeral 2446 denotes a through-hole for exposing a partial region (lens portion) of the lens module 220 to the outside.

The second cam member 244 may be configured to be connected to the fixing frame 260. For example, a guide groove 2444 into which a second projection 2644 of an upper fixing frame 264 is fittable may be formed on a side surface of the second cam member 244. The guide groove 2444 may be formed to be substantially parallel to the optical axis C. For example, the guide groove 2444 may be formed to be completely open upwardly from a point of the second cam member 244 along the optical axis C. The guide groove 2444 may be formed to have a predetermined length. For example, a length DP of the guide groove 2444 may be less than a Z-axis direction length hc2 of the second cam member 244. The guide groove 2444 may be configured to limit upward movement of the second cam member 244 and the lens module 220. For example, the guide groove 2444 may be formed to be open toward an upper portion of the second cam member 244 and to be closed toward a lower portion of the second cam member 244. The guide groove 2444 and the first cam groove 2442 may be configured to be open in different directions. For example, the guide groove 2444 may be open toward the upper portion of the second cam member 244, and the first cam groove 2442 may be open toward the lower portion of the second cam member 244.

The cam assembly 240 may simultaneously function as a regulator for limiting maximum displacement of the lens module 220. For example, the guide groove 2444 and the second projection 2644 of the cam assembly 240 may limit the maximum displacement by which the lens module 220 is movable upwardly.

The fixing frame 260 may include a plurality of members. For example, the fixing frame 260 may include a lower fixing frame 262 and an upper fixing frame 264. However, a component of the fixing frame 260 is not limited to the lower fixing frame 262 and the upper fixing frame 264. The fixing frame 260 may be configured such that a position thereof with respect to the substrate 210 is fixed. As an example, the lower fixing frame 262 may be firmly coupled to the substrate 210 by a fastener or a bonding means. As another example, the substrate 210 may be fitted into the lower fixing frame 262 through a mechanical component.

The lower fixing frame 262 may be configured to fix the first driver 230. For example, a coupling portion 2626 configured to be coupled to the fixing bracket 236 of the first driver 230 may be formed in the lower fixing frame 262. The coupling portion 2626 of the lower fixing frame 262 may be coupled to the fixing bracket 236 of the first driver 230 by a bolt, a fixing pin, or the like. The lower fixing frame 262 may be configured to support the first cam member 242. For example, a seating portion 2622 having a predetermined depth may be formed on opposite side surfaces of the lower fixing frame 262. The seating portion 2622 may be formed to be in contact with the protrusion portion 2424 of the first cam member 242. Accordingly, the lower fixing frame 262 may support the first cam member 242 through the contact between the seating portion 2622 and the protrusion portion 2424. The lower fixing frame 262 may be configured to enable movement of the first cam member 242 in an X-axis direction. For example, the seating portion 2622 of the lower fixing frame 262 may extend to be elongate in the X-axis direction, such that the first cam member 242 may move in the X-axis direction even in a state in which the protrusion portion 2424 and the seating portion 2622 are in contact with each other.

The upper fixing frame 264 may be configured to be coupled to the second cam member 244. For example, the second projection 2644 fitted into the guide groove 2444 of the second cam member 244 may be formed on the upper fixing frame 264. The second projection 2644 may be formed to have a substantially similar size to that of a width Wg2 of the guide groove 2444. For example, the diameter of the second projection 2644 may be equal to the width Wg2 of the guide groove 2444.

The upper fixing frame 264 may align the positions of the second cam member 244 and the lens module 220. As an example, the positions of the second cam member 244 and the lens module 220 in the X-axis direction may be aligned by forming the diameter of the second projection 2644 and the width of the guide groove 2444 to have substantially the same size. As another example, positions of the second cam member 244 and the lens module 220 in a Y-axis direction may be aligned by forming a distance P2 between the opposing second projections 2644 and a shortest distance P1 between the guide grooves 2444 to be substantially the same. Accordingly, the second cam member 244 and the lens module 220 coupled to the upper fixing frame 264 may only move in the optical axis direction.

The upper fixing frame 264 may be configured to prevent separation of the second cam member 244 and the lens module 220. For example, the upper fixing frame 264 may suppress a phenomenon in which the second cam member 244 and the lens module 220 are separated upwardly through coupling between the second projection 2644 and the guide groove 2444.

The upper fixing frame 264 may be configured to fix the first driver 230. For example, a coupling portion 2646 configured to be coupled to the fixing bracket 236 of the first driver 230 may be formed in the upper fixing frame 264. The coupling portion 2646 of the upper fixing frame 264 may be coupled to the fixing bracket 236 of the first driver 230 by a bolt, a fixing pin, or the like, in the same manner as the lower fixing frame 262.

The upper fixing frame 264 may be coupled to the lower fixing frame 262. For example, the upper fixing frame 264 may be firmly coupled to the lower fixing frame 262 through a structure such as a clasp 2648.

The shield can 270 may be configured to protect the above-described components. As an example, the shield can 270 may protect the substrate 210, the lens module 220, the first driver 230, and the cam assembly 240 from external impact. As another example, the shield can 270 may protect the substrate 210 and the first driver 230 from external electromagnetic waves. The shield can 270 may be configured to block external impact and harmful electromagnetic waves, as described above. For example, the shield can 270 may be formed of or include a metal material. However, the material of the shield can 270 is not limited to metal.

Figure 10A:
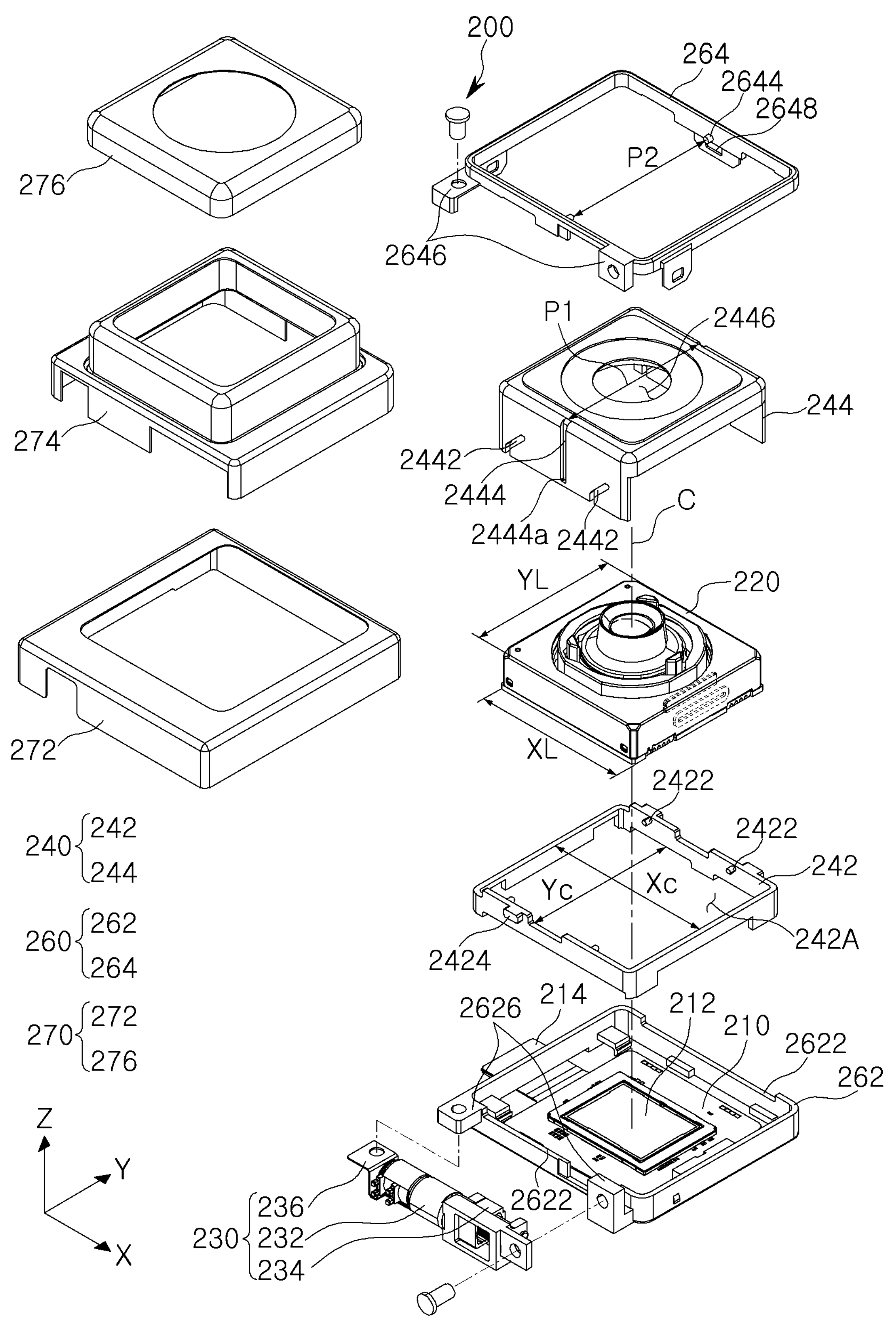
FIGS. 10A to 10E are exploded perspective views of a camera module according to another embodiment of the present disclosure.

The shield can 270 may include a plurality of members. For example, the shield can 270 may include a first shield member 272 and a second shield member 276, as illustrated in FIG. 10A.

The camera module 200 may further include a component for preventing foreign substances or moisture penetration. For example, the camera module 200 may further include an airtight member 274 for closing an interstitial space between the first shield member 272 and the second shield member 276. The airtight member 274 may be formed of an elastically deformable material. For example, the airtight member 274 may be formed of a rubber, epoxy, polymer material, or the like. However, the material of the airtight member 274 is not limited to the above-described materials. The airtight member 274 configured as described above may completely block an interstitial space of the camera module 200 that may be caused by vertical movement of the lens module 220.

The first shield member 272, the airtight member 274, and the second shield member 276 may be sequentially assembled. For example, after the fixing frame 260 and the first shield member 272 are coupled to each other, the airtight member 274 and the second shield member 276 may be sequentially coupled to each other.

Figure 10B:
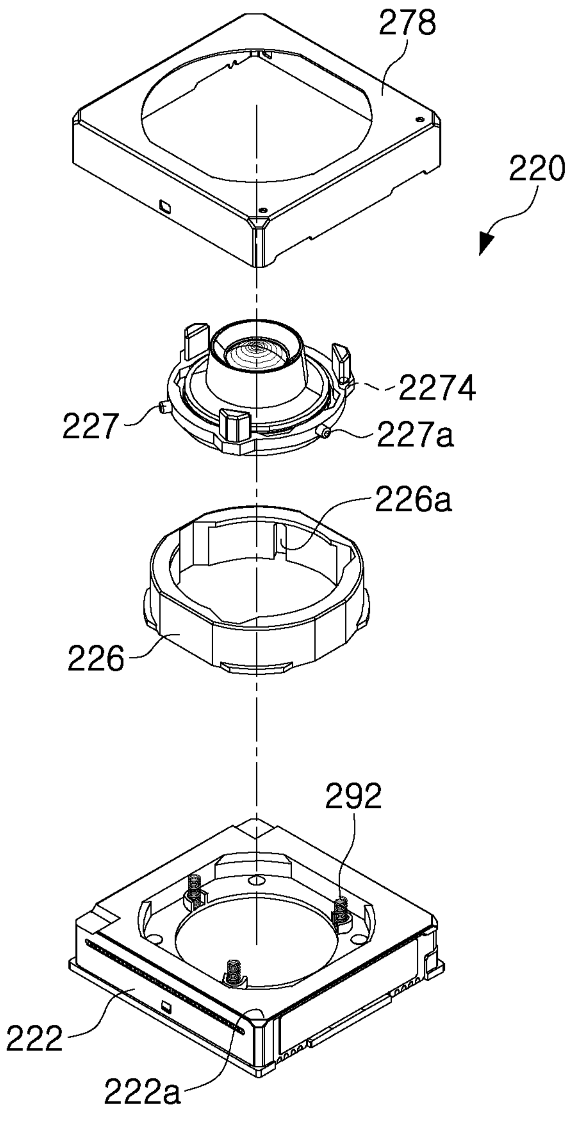

Next, a component of the lens module 220 will be described in detail with reference to FIG. 10B.

The lens module 220 may include a housing 222, a barrel holder 226, and a lens barrel 227. However, the component of the lens module 220 is not limited to the above-described members. For example, the lens module 220 may further include a third shield member 278 for shielding electromagnetic waves.

The housing 222 may be configured to accommodate the barrel holder 226 and the lens barrel 227 described above therein. For example, the housing 222 may be in the form of a hexahedron with open upper and lower surfaces. However, the form of the housing 222 is not limited to the hexahedron.

The barrel holder 226 may be coupled to the housing 222. For example, the barrel holder 226 may be firmly coupled to the housing 222 by a fastener or an adhesive. The barrel holder 226 may be configured to accommodate the lens barrel 227 therein. For example, a space substantially corresponding to a cross-sectional shape of the lens barrel 227 may be formed in the barrel holder 226.

The lens barrel 227 may be coupled to the barrel holder 226. For example, the lens barrel 227 may be coupled to the barrel holder 226 through the plurality of projections **227*a* extending in a circumferential direction and the groove 226*a* formed on an inner circumferential surface of the barrel holder 226. The lens barrel 227 may be configured to be movable in an optical axis direction. For example, the lens barrel 227 may be moved in the optical axis direction along the groove 226*a* of the barrel holder 226. The groove 226*a* of the barrel holder 226 may be configured to prevent separation of the lens barrel 227. For example, the groove 226*a* of the barrel holder 226 may be formed to extend to a predetermined height from a lowest surface of the barrel holder 226, thereby preventing a phenomenon in which the barrel holder 226 is completely separated toward the outside (upper portion) of the barrel holder 226**.

The lens module 220 may further include a component enabling upward movement of the lens barrel 227. For example, the lens module 220 may further include an elastic member 292 for providing driving force (or inertial force) desired for the upward movement of the lens barrel 227. The elastic member 292 may be disposed between the housing 222 and the lens barrel 227, and may be configured to be compressed or expanded by external force. For example, the elastic member 292 may be configured as a coil spring. However, the form of the elastic member 292 is not limited to the coil spring. The elastic member 292 may provide an elastic force to the lens barrel 227 such that a preset value of a distance between the lens barrel 227 and an image sensor is maintained. For example, the elastic member 292 may push up the lens barrel 227 upwardly such that the distance between the lens barrel 227 and the image sensor is maintained to be substantially constant or a maximum value of the distance between the lens barrel 227 and the image sensor is maintained, in the absence of external force.

The lens module 220 configured as described above may maintain a constant distance between the lens barrel 227 and the image sensor, thereby improving imaging and imaging resolution of the camera module 200. In addition, the lens module 220 may maintain a considerable distance between the lens barrel 227 and the image sensor, thereby enabling long-distance imaging and imaging of the camera module 200.

Figure 10C:
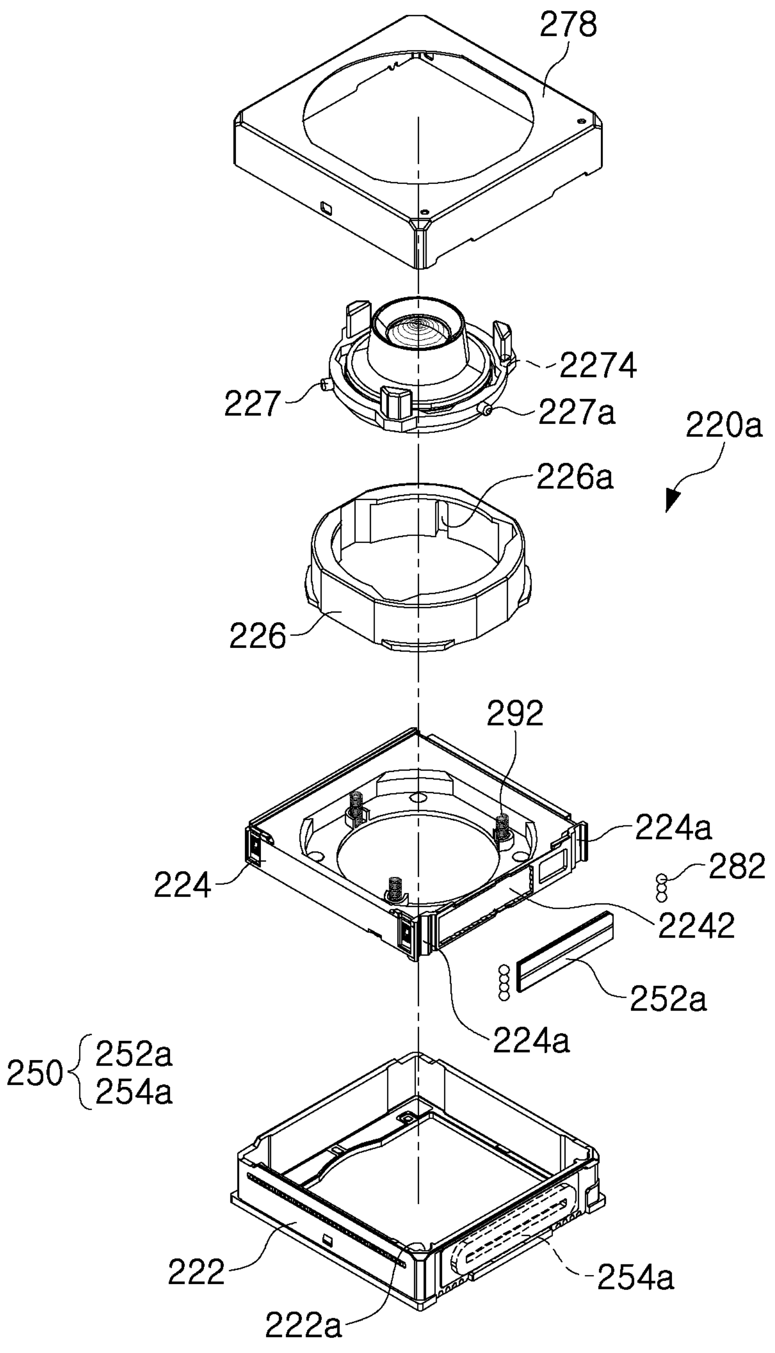
Figure 10D:
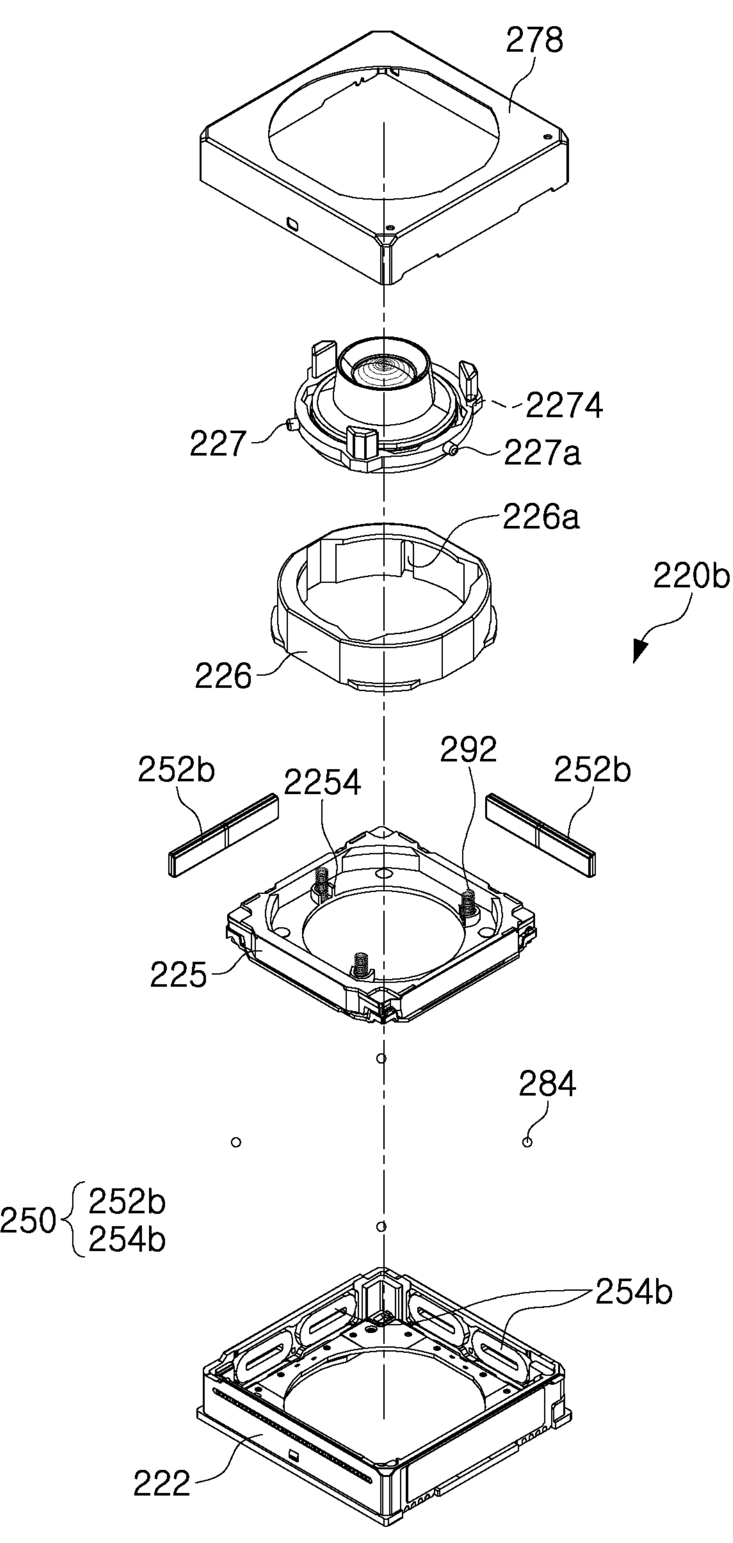

Next, another form of the lens module will be described with reference to FIGS. 10C and 10D.

First, a first modified form of a lens module will be described with reference to FIG. 10C.

A lens module **220*a* may include a housing 222, a first movable frame 224, a barrel holder 226, and a lens barrel 227. However, a component of the lens module 220*c* is not limited to the above-described members. As an example, the lens module 220*a* may further include a second driver 250 for driving the lens barrel 227. As another example, the lens module 220*c* may further include the third shield member 278** for shielding electromagnetic waves.

The housing 222 may be configured to accommodate the first movable frame 224, barrel holder 226, and lens barrel 227 described above therein. For example, the housing 222 may be in the form of a hexahedron with open upper and lower surfaces. However, the form of the housing 222 is not limited to the hexahedron. Some components of the second driver 250 may be disposed on an inner surface of the housing 222. For example, a second coil member **254*a* may be disposed on a first inner surface of the housing 222**.

The first movable frame 224 may be movably disposed in the housing 222. For example, the first movable frame 224 may be configured to move in an optical axis direction in the housing 222. Four side surfaces 2242 of the first movable frame 224 may be formed to oppose inner surfaces of the housing 222, respectively. A second magnet member **252*a* opposing the second coil member 254*a* may be disposed on a first side surface 2242 of the first movable frame 224**.

A component enabling smooth movement of the first movable frame 224 may be additionally disposed between the first movable frame 224 and the housing 222. For example, a plurality of ball bearings 282 may be disposed between grooves **224*a* formed on opposite sides of the closed side surface 2242 and grooves 222*a* of the housing 222. The first movable frame 224 configured as described above may move in the optical axis direction using magnetic force formed between the second magnet member 252*a* and the second coil member 254*a***.

The barrel holder 226 may be coupled to the first movable frame 224. For example, the barrel holder 226 may be firmly coupled to the first movable frame 224 by a fastener or an adhesive. Accordingly, the barrel holder 226 may move in the optical axis direction in the same manner as the first movable frame 224. The barrel holder 226 may be configured to accommodate the lens barrel 227 therein. For example, a space substantially corresponding to a cross-sectional shape of the lens barrel 227 may be formed in the barrel holder 226.

The lens barrel 227 may be coupled to the barrel holder 226. For example, the lens barrel 227 may be coupled to the barrel holder 226 through the plurality of projections **227*a* extending in a circumferential direction and the groove 226*a* formed on an inner circumferential surface of the barrel holder 226. The lens barrel 227 may be configured to be movable in the optical axis direction. For example, the lens barrel 227 may be moved in the optical axis direction along the groove 226*a* of the barrel holder 226. The groove 226*a* of the barrel holder 226 may be configured to prevent separation of the lens barrel 227. For example, the groove 226*a* of the barrel holder 226 may be formed to extend to a predetermined height from the lowest surface of the barrel holder 226, thereby preventing a phenomenon in which the barrel holder 226 is completely separated toward the outside (upper portion) of the barrel holder 226**.

The second driver 250 may be configured to drive the first movable frame 224. For example, the second driver 250 may drive the first movable frame 224 in the optical axis direction. The second driver 250 may include the second magnet member **252*a* and the second coil member 254*a*. The second magnet member 252*a* and the second coil member 254*a* may be disposed to oppose each other substantially. For example, the second magnet member 252*a* may be disposed on the first side surface 2242 of the first movable frame 224, and the second coil member 254*a* may be disposed on a first inner surface of the housing 222 opposing the first side surface 2242**.

The lens module **220*c* may further include a component enabling upward movement of the lens barrel 227 separately from the second driver 250. For example, the lens module 220*c* may further include an elastic member 292 for providing driving force (or inertia force) desired for the upward movement of the lens barrel 227. The elastic member 292 may be disposed between the first movable frame 224 and the lens barrel 227, and may be configured to be compressed or expanded by external force. For example, the elastic member 292 may be configured as a coil spring. However, the form of the elastic member 292 is not limited to the coil spring. The elastic member 292 may provide elastic force to the lens barrel 227 such that a preset value of a distance between the lens barrel 227 and an image sensor is maintained. For example, the elastic member 292 may push up the lens barrel 227 upwardly such that the distance between the lens barrel 227 and the image sensor is maintained to be substantially constant or a maximum value of the distance between the lens barrel 227 and the image sensor is maintained, in the absence of external force. A component for fixing a position of the elastic member 292 may be formed in the first movable frame 224 and the lens barrel 227. For example, a seating portion for fixing one end of the elastic member 292 may be formed on the first movable frame 224, and a projection 2274 for fixing the other end of the elastic member 292 may be formed on the lens barrel 227**.

The lens module 220*a* configured as described above may maintain a constant distance between the lens barrel 227 and the image sensor, thereby improving the imaging and imaging resolution of the camera module 200. In addition, the lens module 220*a* may maintain a considerable distance between the lens barrel 227 and the image sensor, thereby enabling long-distance imaging and imaging of the camera module 200. In addition, the lens module 220*a*, according to the present example embodiment, may move the lens barrel 227 in the optical axis direction, thereby improving the performance of the camera module 200 through a focus adjustment (AF) function.

Next, a second modified form of a lens module will be described with reference to FIG. 10D.

The lens module 220*b* may include the housing 222, a second movable frame 225, a barrel holder 226, and the lens barrel 227. However, the component of the lens module 220*c* is not limited to the above-described members. As an example, the lens module 220*c* may further include the second driver 250 for driving the lens barrel 227. As another example, the lens module 220*c* may further include the third shield member 278 for shielding electromagnetic waves.

The housing 222 may be configured to accommodate the above-described second movable frame 225, barrel holder 226, and lens barrel 227 therein. For example, the housing 222 may be in the form of a hexahedron with open upper and lower surfaces. However, the form of the housing 222 is not limited to the hexahedron. Some components of the second driver 250 may be disposed on an inner surface of the housing 222. For example, a second coil member 254*b* may be disposed on two or more adjacent inner surfaces of the housing 222, respectively.

The second movable frame 225 may be disposed to be in direct or indirect contact with a surface of the housing 222. In more detail, the second movable frame 225 may be disposed to be in contact with a bottom surface of the housing 222 through a ball bearing 284. The second movable frame 225 may be configured to include some components of the second driver 250. For example, a second magnet member 252*b* may be disposed on two adjacent side surfaces of the second movable frame 225, respectively. The second movable frame 225 may be configured to move in a direction, intersecting an optical axis. For example, the second movable frame 225 may move in the housing 222 in two or more different directions, intersecting the optical axis, by means of the ball bearing 284. In more detail, the second movable frame 225 may move in the direction, intersecting the optical axis, by means of magnetic force formed between two pairs of second magnet members 252*b* and second coil members 254*b*.

The barrel holder 226 may be coupled to the second movable frame 225. For example, the barrel holder 226 may be firmly coupled to the second movable frame 225 by a fastener or an adhesive. Accordingly, the barrel holder 226 may move in the direction, intersecting the optical axis, in the same manner as the second movable frame 225. The barrel holder 226 may be configured to accommodate the lens barrel 227 therein. For example, a space substantially corresponding to a cross-sectional shape of the lens barrel 227 may be formed in the barrel holder 226.

The lens barrel 227 may be coupled to the barrel holder 226. For example, the lens barrel 227 may be coupled to the barrel holder 226 through the plurality of projections 227*a* extending in a circumferential direction and the groove 226*a* formed on an inner circumferential surface of the barrel holder 226. The lens barrel 227 may be configured to be movable in an optical axis direction. For example, the lens barrel 227 may be moved in the optical axis direction along the groove 226*a* of the barrel holder 226. The groove 226*a* of the barrel holder 226 may be configured to prevent separation of the lens barrel 227. For example, the groove 226*a* of the barrel holder 226 may be formed to extend to a predetermined height from the lowest surface of the barrel holder 226, thereby preventing a phenomenon in which the barrel holder 226 is completely separated toward the outside (upper portion) of the barrel holder 226.

The second driver 250 may be configured to drive the second movable frame 225. For example, the second driver 250 may drive the second movable frame 225 in the direction, intersecting the optical axis. The second driver 250 may include the second magnet member 252*b* and the second coil member 254*b*.

The lens module 220*c* may further include a component enabling upward movement of the lens barrel 227 separately from the second driver 250. For example, the lens module 220*c* may further include an elastic member 292 for providing driving force (or inertia force) desired for the upward movement of the lens barrel 227. The elastic member 292 may be disposed between the second movable frame 225 and the lens barrel 227, and may be configured to be compressed or expanded by an external force. For example, the elastic member 292 may be configured in the form of a coil spring. However, the form of the elastic member 292 is not limited to the coil spring. The elastic member 292 may provide elastic force to the lens barrel 227 such that a preset value of a distance between the lens barrel 227 and an image sensor is maintained. For example, the elastic member 292 may push up the lens barrel 227 upwardly such that the distance between the lens barrel 227 and the image sensor is maintained to be substantially constant or a maximum value of the distance between the lens barrel 227 and the image sensor is maintained, in the absence of external force. A component for fixing a position of the elastic member 292 may be formed in the second movable frame 225 and the lens barrel 227. For example, the seating portion 2254 for fixing one end of the elastic member 292 may be formed on the second movable frame 225, and the projection 2274 for fixing the other end of the elastic member 292 may be formed on the lens barrel 227.

The lens module 220*c* configured as above may maintain a constant distance between the lens barrel 227 and the image sensor, thereby improving the imaging and imaging resolution of the camera module 200. In addition, the lens module 220*c* may maintain a considerable distance between the lens barrel 227 and the image sensor, thereby enabling long-distance imaging and imaging of the camera module 200. In addition, the lens module 220*c*, according to the present example embodiment, may move the lens barrel 227 in the direction, intersecting the optical axis, thereby improving the performance of the camera module 200 through an optical image stabilization (OIS) function.

Figure 10E:
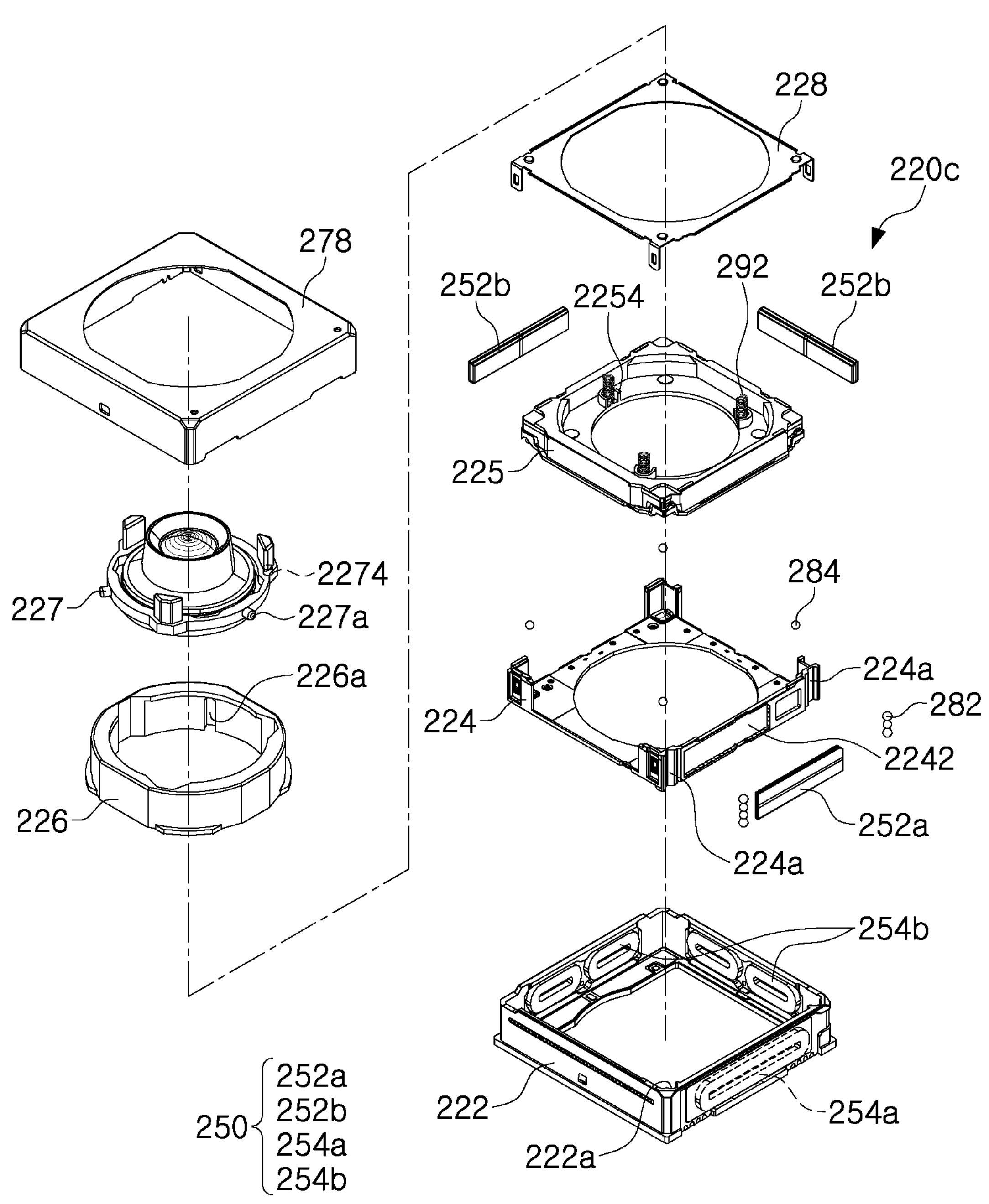

Next, a third modified form of a lens module will be described with reference to FIG. 10E.

The lens module 220*c* may include the housing 222, the first movable frame 224, the second movable frame 225, the barrel holder 226, and the lens barrel 227. However, the component of the lens module 220*c* is not limited to the above-described members. As an example, the lens module 220*c* may further include the second driver 250 for driving the lens barrel 227. As another example, the lens module 220*c* may further include a fixing clip 228 for fixing the first movable frame 224 and the second movable frame 225 to the housing 222, and the third shield member 278 for shielding electromagnetic waves.

The housing 222 may be configured to accommodate the first movable frame 224, the second movable frame 225, the barrel holder 226, and the lens barrel 227 described above therein. For example, the housing 222 may be in the form of a hexahedron with open upper and lower surfaces. However, the form of the housing 222 is not limited to the hexahedron. Some components of the second driver 250 may be disposed on an inner surface of the housing 222. For example, the second coil member 254*a* may be disposed on a first inner surface of the housing 222, and the second coil member 254*b* may be disposed on a second inner surface and a third inner surface, respectively.

The first movable frame 224 may be disposed to be movably in the housing 222. For example, the first movable frame 224 may be configured to move in an optical axis direction in the housing 222. One side surface 2242 of the first movable frame 224 may be in a closed form to oppose the inner surface of the housing 222, and three side surfaces of the first movable frame 224 may be in an open form to expose a side surface of the second movable frame 225. The second magnet member 252*a* of the second driver 250 opposing the second coil member 254*a* may be disposed on the closed side surface 2242. A component enabling smooth movement of the first movable frame 224 may be additionally disposed between the first movable frame 224 and the housing 222. For example, the plurality of ball bearings 282 may be disposed between the grooves 224*a* formed on opposite sides of the closed side surface 2242 and the grooves 222*a* of the housing 222. The first movable frame 224 configured as described above may move in the optical axis direction by means of magnetic force formed between the second magnet member 252*a* and the second coil member 254*a*.

The second movable frame 225 may be disposed to be in direct or indirect contact with a surface of the first movable frame 224. For example, a lower surface of the second movable frame 225 may be disposed to be in contact with an upper surface (or bottom surface) of the first movable frame 2240 through the ball bearing 284. The second movable frame 225 may be configured to move in a direction, intersecting an optical axis. For example, the second movable frame 225 may move on the first movable frame 224 in two different directions, intersecting the optical axis, by means of the ball bearing 284. In more detail, the second movable frame 225 may move in the direction, intersecting the optical axis, by means of magnetic force formed between two pairs of second magnet members 252*b* and second coil members 254*b*.

The second movable frame 225 may be moved in the optical axis direction. In more detail, the lower surface of the second movable frame 225 may be in direct or indirect contact with the first movable frame 224. Thus, when the first movable frame 224 moves in the optical axis direction, the second movable frame 225 also may move together with the first movable frame 224 in the optical axis direction.

The barrel holder 226 may be coupled to the second movable frame 225. For example, the barrel holder 226 may be firmly coupled to the second movable frame 225 by a fastener or an adhesive. Accordingly, the barrel holder 226 may move in a direction of the optical axis and the direction, intersecting and the optical axis, in the same manner as the second movable frame 225. The barrel holder 226 may be configured to accommodate the lens barrel 227 therein. For example, a space substantially corresponding to a cross-sectional shape of the lens barrel 227 may be formed in the barrel holder 226.

The lens barrel 227 may be coupled to the barrel holder 226. For example, the lens barrel 227 may be coupled to the barrel holder 226 through the plurality of projections 227*a* extending in a circumferential direction and the groove 226*a* formed on an inner circumferential surface of the barrel holder 226. The lens barrel 227 may be configured to be movable in the optical axis direction. For example, the lens barrel 227 may be moved in the optical axis direction along the groove 226*a* of the barrel holder 226. The groove 226*a* of the barrel holder 226 may be configured to prevent separation of the lens barrel 227. For example, the groove 226*a* of the barrel holder 226 may be formed to extend to a predetermined height from the lowest surface of the barrel holder 226, thereby preventing a phenomenon in which the barrel holder 226 is completely separated toward the outside (upper portion) of the barrel holder 226.

The second driver 250 may be configured to drive the first movable frame 224 and the second movable frame 225. For example, the second driver 250 may drive the first movable frame 224 in the optical axis direction, and drive the second movable frame 225 in the direction, intersecting the optical axis.

The second driver 250 may include second magnet members 252*a* and 252*b* and second coil members 254*a* and 254*b*. The second magnet members 252*a* and 252*b* and the second coil members 254*a* and 254*b* may be disposed at different orientations with respect to the optical axis. For example, the second magnet member 252*a* and the second coil member 254*b* may be disposed to oppose the closed side surface 2242 of the first movable frame 224 and the first inner side surface of the housing 222, respectively, and, the two pairs of second magnet members 252*b* and second coil members 254*b* may oppose each other on different side surfaces of the second movable frame 225 and the second inner surface and the third inner surface of the housing 222, respectively.

The lens module 220*c* may further include a component enabling upward movement of the lens barrel 227 separately from the second driver 250. For example, the lens module 220*c* may further include an elastic member 292 for providing driving force (or inertia force) desired for the upward movement of the lens barrel 227. The elastic member 292 may be disposed between the second movable frame 225 and the lens barrel 227, and may be configured to be compressed or expanded by an external force. For example, the elastic member 292 may be configured as a coil spring.

However, the form of the elastic member 292 is not limited to the coil spring. The elastic member 292 may provide elastic force to the lens barrel 227 such that a preset value of a distance between the lens barrel 227 and an image sensor is maintained. For example, the elastic member 292 may push up the lens barrel 227 upwardly such that the distance between the lens barrel 227 and the image sensor is maintained to be substantially constant or a maximum value of the distance between the lens barrel 227 and the image sensor is maintained, in the absence of external force. A component for fixing a position of the elastic member 292 may be formed in the second movable frame 225 and the lens barrel 227. For example, the seating portion 2254 for fixing one end of the elastic member 292 may be formed on the second movable frame 225, and the projection 2274 for fixing the other end of the elastic member 292 may be formed on the lens barrel 227.

The lens module 220*c* configured as above may maintain a constant distance between the lens barrel 227 and the image sensor, thereby improving the imaging and imaging resolution of the camera module 200. In addition, the lens module 220*c* may maintain a considerable distance between the lens barrel 227 and the image sensor, thereby enabling long-distance imaging and imaging of the camera module 200. In addition, the lens module 220*c*, according to the present example embodiment, may move the lens barrel 227 in the optical axis direction and the direction, intersecting the optical axis, thereby improving the performance of the camera module 200 through an optical image stabilization (OIS) function.

Figure 12:
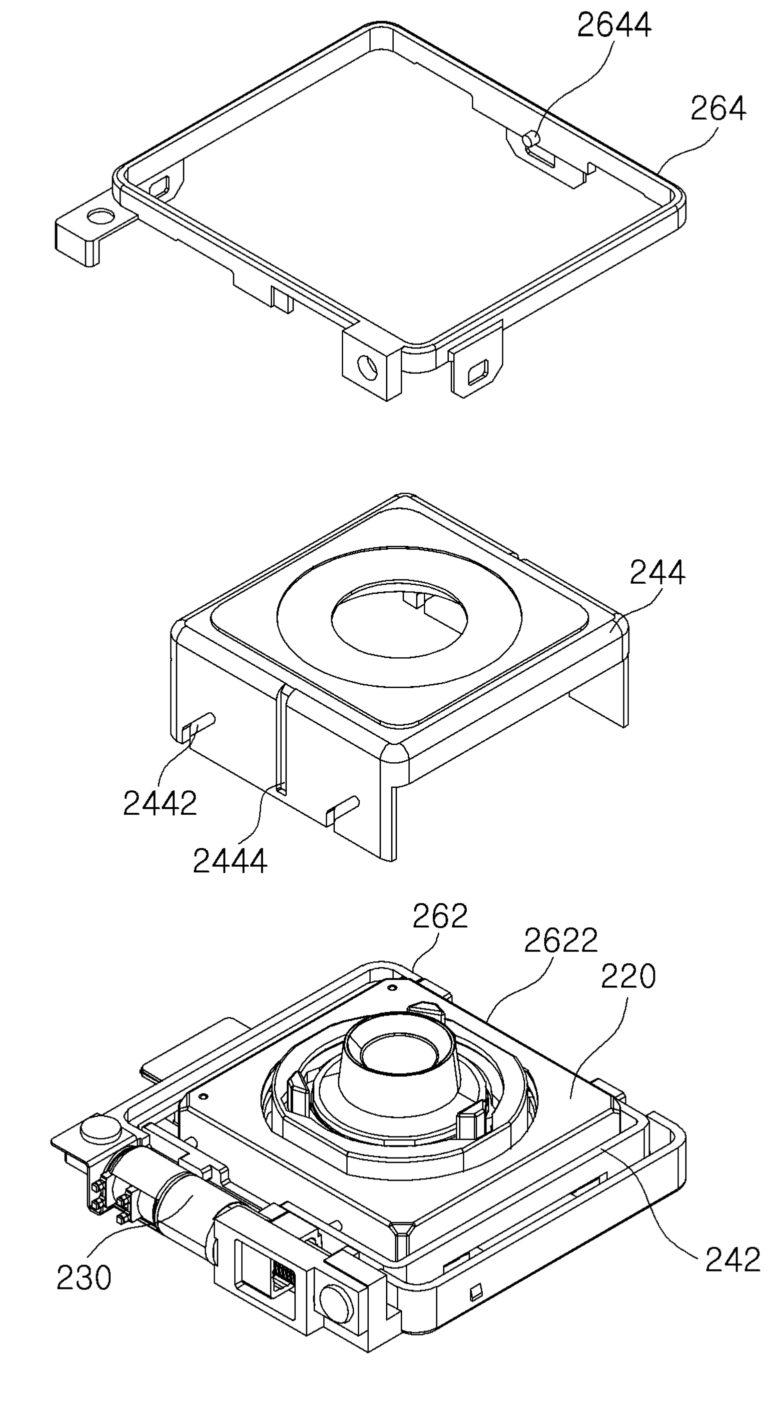
Figure 13:
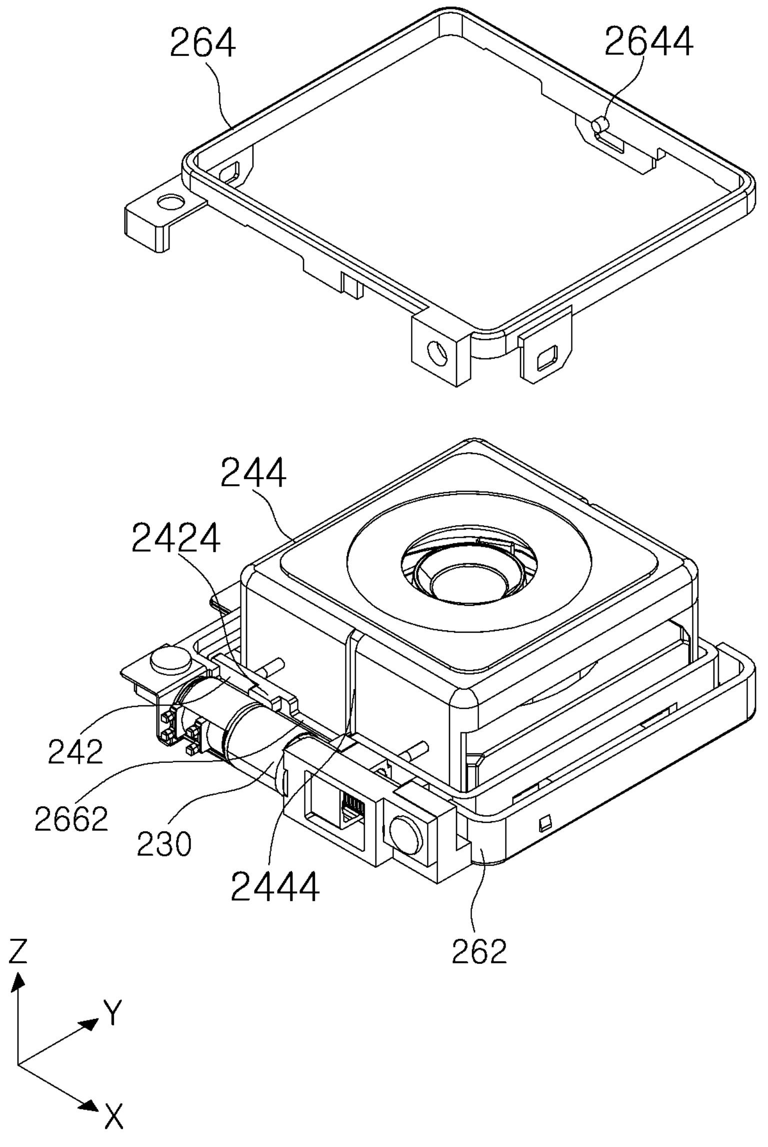

Next, coupling between components and an assembly sequence of the components will be described with reference to FIGS. 11 to 13.

The camera module 200, according to the present example embodiment, may be configured to simplify an assembly process and increase the ease of the assembly process. For example, the camera module 200, according to the present example embodiment, may be configured such that coupling between the above-described components is substantially made in sequence in a direction (optical axis direction with reference to FIG. 11). In more detail, the substrate 210, the lower fixing frame 262, the first cam member 242, the lens module 220, the second cam member 244, and the upper fixing frame 264 may be sequentially coupled along the optical axis C.

The coupling between the components may be performed in a fitting manner without a fastening member to enable quick assembly. As an example, assembly between the lower fixing frame 262 and the first cam member 242 may be performed by contact coupling between left and right seating portions 2622 and a plurality of protrusions portions 2424. As another example, assembly between the first cam member 242 and the second cam member 244 may be performed by coupling between a plurality of first projections 2422 and cam grooves 2442 in a fitting manner. As another example, assembly between the upper fixing frame 264 and the second cam member 244 may be performed by coupling between the second projection 2644 and the guide groove 2444 in a fitting manner.

In the camera module 200 configured as above, parts thereof may be assembled and coupled in a manner of simply stacking the listed components without a fastener, thereby simplifying the assembly process of the camera module 200, and enabling rapid manufacturing and production of the camera module 200.

Figure 14:
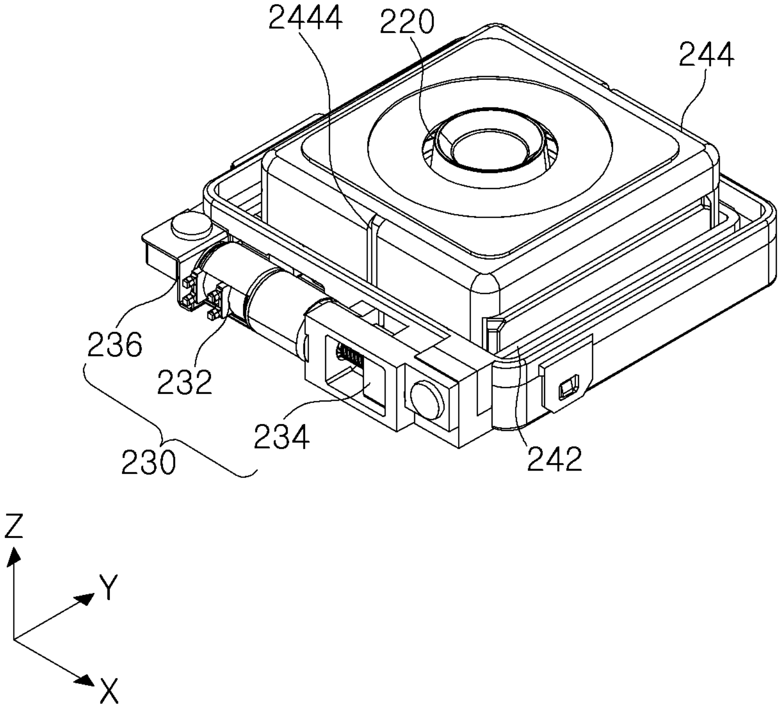
Figure 15:
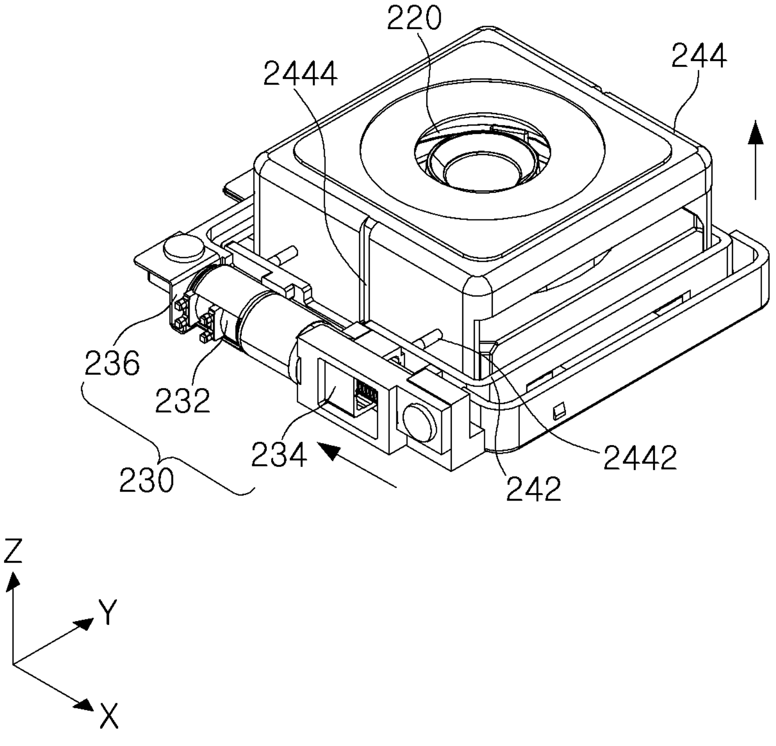
FIGS. 15 and 16 are operation state views of the camera module illustrated in FIG. 10.
Figure 16:
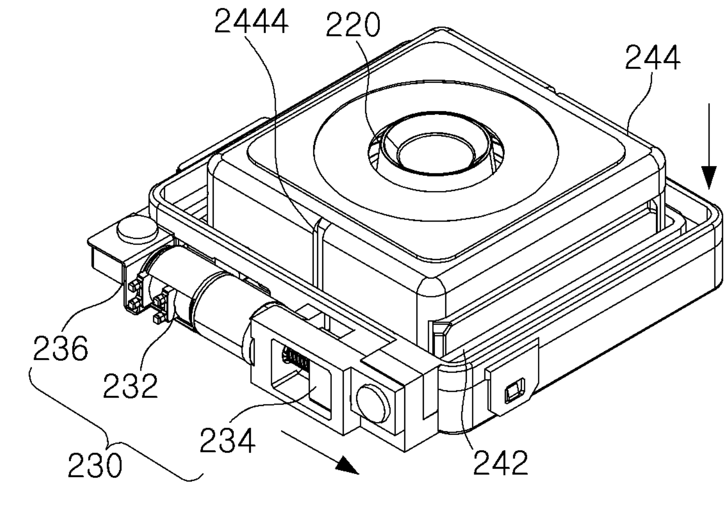
Figure 16:
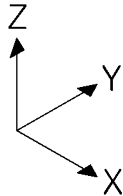

Next, an operation example of the camera module 200 will be described with reference to FIGS. 14 to 16.

The camera module 200, according to the present example embodiment, may be configured to be variable in an optical axis direction. For example, the camera module 200 may have different sizes depending on a driving state of the camera module 200. As a specific example, the camera module 200 may have a minimum size (based on the optical axis direction) in an inactive state (a state in which imaging and imaging are not substantially performed), and may have a maximum size in an active state.

The size of the camera module 200 may vary according to the movement of the lens module 220 in the optical axis direction. For example, in an inactive state of the camera module 200, the lens module 220 may be positioned at a point closest to the substrate 210 to enable the camera module 200 to be thinned (see FIGS. 14 and 16). As another example, in the active state of the camera module 200, the lens module 220 may be positioned at a point having a maximum distance from the image sensor 212 of the substrate 210 to enable imaging and imaging through the camera module 200. For reference, a maximum distance between the lens module 220 and the image sensor 212 may be related to the optical properties of an optical imaging system included in the lens module 220. For example, a maximum distance from a distal end of the lens module 220 (or an image side surface of a rearmost lens) to the image sensor 212 may have a size substantially the same as that of a back focal length (BFL) of the optical imaging system.

Vertical movement of the lens module 220 may be directly or indirectly affected by the driving of the first driver 230. As an example, when the operation member 234 of the first driver 230 moves in a −X-axis direction, upward (+Z-axis direction) movement of the lens module 220 limited by the cam assembly 240 may be allowed. In more detail, the lens barrel 227 of the lens module 220 may be moved upwardly (+Z-axis direction) by elastic force or restoring force of the elastic member 292 disposed between the second movable frame 225 and the lens barrel 227. As another example, when the operation member 234 of the first driver 230 moves in a +X-axis direction, the lens module 220 may be moved downwardly (−Z-axis direction) by the cam assembly 240. In more detail, the lens barrel 227 of the lens module 220 may be moved downwardly (−Z-axis direction) while being pressed by the second cam member 244, and the elastic member 292 disposed between the second movable frame 225 and the lens barrel 227 may be compressed (that is, the elastic member 292 may accumulate restoring force for moving the lens barrel 227 upwardly in this process).

Figure 17:
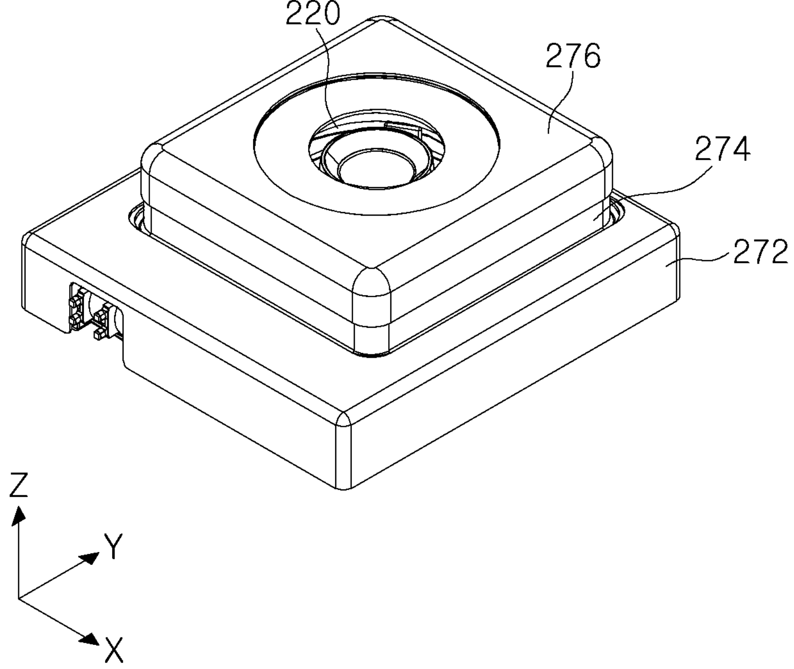
FIG. 17 is a combined perspective view of the camera module illustrated in FIG. 10.
Figure 18:
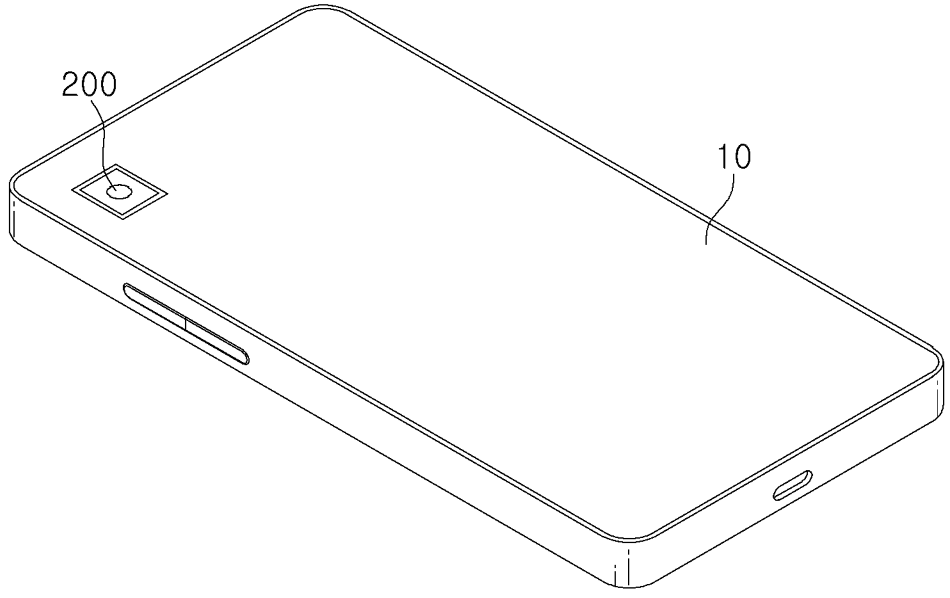
FIGS. 18 and 19 are perspective views of a portable terminal, including the camera module illustrated in FIG. 10.
Figure 19:
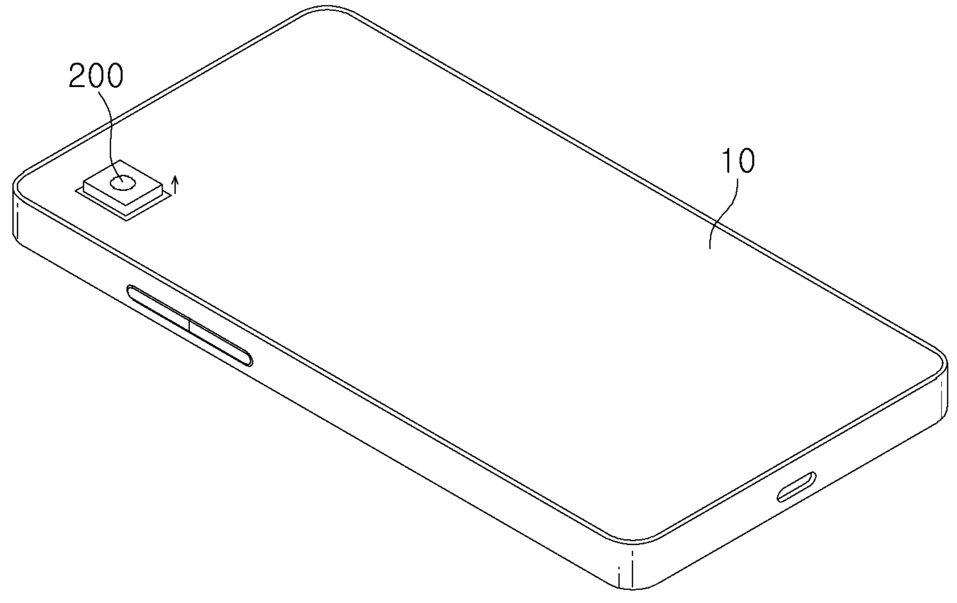

The above-described camera module 200 may be configured to be easily mounted on various electronic devices, as illustrated in FIG. 17. For example, the camera module 200 may be mounted on a portable terminal 10, as illustrated in FIGS. 18 and 19.

The camera module 200 may be configured not to interfere with thinning of an electronic device on which the camera module 20 is mounted. For example, the camera module 200 may be configured not to be exposed to an outer surface of a mobile terminal 10 in an inactive state (see FIG. 18), and configured to be exposed to the outer surface of the mobile terminal 10 in an active state (see FIG. 19).

The camera module 200 configured as described above may enable high-resolution imaging and imaging without interfering with thinning of the portable terminal 10.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:

a lens module comprising a lens barrel accommodating one or more lenses, wherein the lens barrel is configured to move in an optical axis direction separately and independently from the lens module;

a fixing frame having a rectangular cross-section formed along a circumference of the lens module;

a first driver, disposed along a first side surface of the fixing frame, configured to provide a first driving force in a first direction intersecting an optical axis of the lenses; and a cam assembly configured to convert the first driving force into a second driving force in the optical axis direction, the cam assembly comprising a first cam member configured to move in the first direction and a second cam member extending in a diagonal direction with respect to the first direction, wherein the fixing frame comprises a lower fixing frame having a seat portion configured to partially contact a protrusion portion extending in a direction opposite to a first projection from a side surface of the first cam member, and an upper fixing frame having a second projection, and wherein the second cam member has a guide groove extending in the optical axis direction, and the second projection of the upper fixing frame is configured to fit into the guide groove of the second cam member.

2. The camera module of claim 1, wherein the first driver comprises:

a drive motor; and an operation member configured to move on a drive shaft of the drive motor in the first direction.

3. The camera module of claim 1, wherein the first cam member has the first projection protruding toward a side surface of the lens module; and the second cam member has a first cam groove configured to fit the first projection.

4. The camera module of claim 3, wherein the first cam groove is open toward a lower portion of the second cam member, and the guide groove is open toward an upper portion of the second cam member.

5. The camera module of claim 1, further comprising:

a first shield can configured to surround a circumference of the fixing frame;

a second shield can configured to cover an upper portion of the second cam member; and an airtight member configured to seal a space between the first shield can and the second shield can.

6. The camera module of claim 1, wherein the lens module further comprises a housing, and the lens barrel is disposed in the housing.

7. The camera module of claim 6, further comprising:

an elastic member, disposed between the housing and the lens barrel, configured to provide inertial force pushing up the lens barrel upwardly.

8. The camera module of claim 6, wherein the lens module further comprises:

a first movable frame, disposed in the housing, configured to move in the optical axis direction;

a second movable frame, disposed on the first movable frame, configured to move in the first direction intersecting the optical axis; and a barrel holder disposed on the second movable frame and coupled to the lens barrel.

9. The camera module of claim 8, wherein the lens module further comprises a second driver configured to drive the first movable frame in the optical axis direction or to drive the second movable frame in the first direction intersecting the optical axis.

* * * * *